(12) United States Patent
Ikeda et al.

(10) Patent No.: US 12,693,675 B2
(45) Date of Patent: Jul. 28, 2026

(54) MOVING OBJECT, SERVER, AND METHOD OF MANUFACTURING MOVING OBJECT

(71) Applicant: TOYOTA JIDOSHA KABUSHIKI KAISHA, Toyota (JP)

(72) Inventors: Keigo Ikeda, Nisshin (JP); Shogo Yasuyama, Okazaki (JP); Noritsugu Iwazaki, Shizuoka-ken (JP); Takeshi Kanou, Seto (JP); Daiki Yokoyama, Miyoshi (JP); Go Inoue, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 18/653,390

(22) Filed: May 2, 2024

(65) Prior Publication Data

US 2024/0377832 A1 Nov. 14, 2024

(30) Foreign Application Priority Data

May 11, 2023 (JP) ................................. 2023-078687
Nov. 2, 2023 (JP) ................................. 2023-188214

(51) Int. Cl.
| | |
|---|---|
| *G05D 1/227* | (2024.01) |
| *G05D 1/622* | (2024.01) |
| *G05D 1/86* | (2024.01) |
| *G05D 107/70* | (2024.01) |
| *G05D 109/10* | (2024.01) |
| *G05D 111/10* | (2024.01) |
| *G05D 111/30* | (2024.01) |

(52) U.S. Cl.
CPC ............. *G05D 1/227* (2024.01); *G05D 1/622* (2024.01); *G05D 1/86* (2024.01); *G05D*

*2107/70* (2024.01); *G05D 2109/10* (2024.01); *G05D 2111/10* (2024.01); *G05D 2111/30* (2024.01)

(58) Field of Classification Search
CPC .... G05D 1/622; G05D 1/0212; B62D 15/025; B62D 65/12; G05B 19/41805; B60S 5/00; B63B 73/30
See application file for complete search history.

(56) References Cited

U.S. PATENT DOCUMENTS

| | | | |
|---|---|---|---|
| 2017/0320529 A1* | 11/2017 | Nordbruch | ........... G05D 1/0212 |
| 2020/0010132 A1* | 1/2020 | Miyake | ................. B62D 65/12 |
| 2020/0156722 A1* | 5/2020 | Watkins | ............... B62D 15/025 |
| 2020/0198714 A1* | 6/2020 | Watanabe | ........ G05B 19/41805 |

FOREIGN PATENT DOCUMENTS

| | | | | |
|---|---|---|---|---|
| CA | 3224947 A1 * | 2/2023 | ............. | B63B 73/30 |
| JP | H0427724 Y2 * | 7/1992 | ................ | B60S 5/00 |
| JP | 2017-538619 A | 12/2017 | | |
| JP | 2020100179 A | 7/2020 | | |

* cited by examiner

*Primary Examiner* — Yuri Kan
(74) *Attorney, Agent, or Firm* — Sughrue Mion, PLLC

(57) ABSTRACT

A moving object manufactured in a factory comprises: a driving controller that implements driving control over the moving object by unmanned driving during a course of manufacture of the moving object in the factory; a process completion detector that detects completion of a process by at least one step included in the course of manufacture; and a control content change unit that changes a content in control over the moving object when the completion of the process is detected.

10 Claims, 18 Drawing Sheets

Fig.2

VEHICLE

START

S5 — RECEIVE RUNNING CONTROL SIGNAL FROM SERVER

S6 — CONTROL ACTUATOR USING RUNNING CONTROL SIGNAL

END

SERVER

START

S1 — ACQUIRE VEHICLE LOCATION INFORMATION USING DETECTION RESULT FROM EXTERNAL SENSOR

S2 — DETERMINE NEXT TARGET LOCATION

S3 — GENERATE RUNNING CONTROL SIGNAL

S4 — TRANSMIT RUNNING CONTROL SIGNAL TO VEHICLE

END

| LARGE STEP | MIDDLE STEP | SMALL STEP | CONTROL CONTENT TO BE ADDED OR CHANGED |
|---|---|---|---|
| MOUNTING STEP | OBJECT DETECTION DEVICE MOUNTING STEP | RADAR DEVICE MOUNTING STEP | ·IMPLEMENT COLLISION PREVENTION CONTROL USING RADAR DEVICE<br>·CHANGE FROM REMOTE CONTROL TO AUTOMATIC RUNNING BY DRIVING CONTROL BY VEHICLE |
| | | VEHICLE-MOUNTED CAMERA MOUNTING STEP | ·IMPLEMENT COLLISION PREVENTION CONTROL USING VEHICLE-MOUNTED CAMERA<br>·ACQUIRE VEHICLE SPEED DATA USING IMAGE CAPTURED BY VEHICLE-MOUNTED CAMERA |
| | SPEED DETECTION DEVICE MOUNTING STEP | WHEEL SPEED SENSOR MOUNTING STEP | ·ACQUIRE VEHICLE SPEED DATA USING WHEEL SPEED DATA<br>·ESTIMATE SELF LOCATION USING WHEEL SPEED DATA |
| | | ACCELERATION SENSOR MOUNTING STEP | ·ACQUIRE VEHICLE SPEED DATA USING ACCELERATION DATA<br>·ESTIMATE SELF LOCATION USING ACCELERATION DATA |
| | ... | ... | ... |
| | FINAL STEP | — | ·INCREASE UPPER LIMIT OF VEHICLE SPEED LIMIT<br>·EXPAND PERMISSIBLE RANGE OF RUDDER ANGLE |
| ADJUSTING STEP | WHEEL ALIGNMENT ADJUSTING STEP | — | ·INCREASE UPPER LIMIT OF VEHICLE SPEED LIMIT |
| | DRIVING BACKLASH ADJUSTING STEP | — | ·INCREASE UPPER LIMIT OF VEHICLE SPEED LIMIT<br>·EXPAND PERMISSIBLE RANGE OF RUDDER ANGLE |
| | SUSPENSION ADJUSTING STEP | — | ·INCREASE UPPER LIMIT OF VEHICLE SPEED LIMIT<br>·EXPAND PERMISSIBLE RANGE OF RUDDER ANGLE |
| | DETECTION DEVICE MOUNTING POSITION ADJUSTING STEP | — | ·INCREASE UPPER LIMIT OF VEHICLE SPEED LIMIT<br>·EXPAND PERMISSIBLE RANGE OF RUDDER ANGLE |
| | ... | ... | ... |
| ... | ... | ... | |

MOVING OBJECT, SERVER, AND METHOD OF MANUFACTURING MOVING OBJECT

CROSS REFERENCE TO RELATED APPLICATIONS

The present application claims priority from Japanese patent application JP2023-078687 filed on May 11, 2023 and Japanese patent application JP2023-188214 filed on Nov. 2, 2023, the disclosures of which are hereby incorporated in their entirety by reference into the present application.

BACKGROUND

Field

The present disclosure relates to a moving object, a server, and a method of manufacturing a moving object.

Related Art

For example, Japanese Patent Application Publication (Translation of PCT Application) No. 2017-538619 discloses a vehicle running method of causing a vehicle to run autonomously or by remote control in a manufacturing system for manufacture of the vehicle from an end of an assembly line of the manufacturing system to a parking area of the manufacturing system.

It is possible to implement driving control over a vehicle by remote control or autonomous control even before finish of the vehicle on the assumption that the vehicle is capable of running by remote control or autonomous control. Meanwhile, when the vehicle becomes nearly finished, various processes may be performed on the vehicle in corresponding steps such as incorporation of a part or change of a control parameter. This induces a desire for a technique that allows driving control over the vehicle to be implemented favorably for each step by remote control or autonomous control. This is a problem relating not only to a vehicle but common to any moving object.

SUMMARY

The present disclosure is feasible in the following aspects.

(1) According to a first aspect of the present disclosure, a moving object manufactured in a factory is provided. The moving object comprises: a driving controller that implements driving control over the moving object by unmanned driving during a course of manufacture of the moving object in the factory; a process completion detector that detects completion of a process by at least one step included in the course of manufacture; and a control content change unit that changes a content in control over the moving object when the completion is detected.

The moving object of this aspect allows a content in the control over the moving object to be changed each time a process by a step is completed, making it possible to implement driving control over the moving object favorably for each step by remote control or autonomous control.

(2) The moving object of the above-described aspect may further comprise a communication unit for receiving a control command for remote control. A driving controller may implement driving control over the moving object in response to the received control command during the course of manufacture.

The moving object of this aspect allows a content in the control over the moving object to be changed each time a process by a step is completed, making it possible to implement driving control over the moving object favorably for each step by remote control.

(3) In the moving object of the above-described aspect, the process completion detector may detect the completion of a process of adding an element to the moving object or a process of changing an element provided in the moving object performed by the at least one step. When the completion is detected, the control content change unit may change the content in such a manner as to implement the control using the element added to the moving object or the element in the moving object changed as a result of the completion.

The moving object of this aspect makes it possible to use the element added to the moving object or the changed element in the moving object in response to a progress status of the course of manufacture of the moving object, allowing the moving object to fulfill performance properly during moving by remote control in response to the progress status of the course of manufacture.

(4) In the moving object of the above-described aspect, the step may include an object detection device mounting step where a process of adding an object detection device as the element to the moving object is performed, the object detection device including at least one of a radar device and a camera, and being capable of detecting an object around the moving object. When the completion of the object detection device mounting step is detected, the control content change unit may change the content in such a manner as to implement collision prevention control using the added object detection device.

According to the moving object of this aspect, along with the completion of the object detection device mounting step, it is possible to prevent collision during moving of the moving object.

(5) In the moving object of the above-described aspect, the control content change unit may further change the content in such a manner as to cause the moving object to run by driving control over the moving object using the collision prevention control instead of driving control by the remote control.

According to the moving object of this aspect, along with the completion of the object detection device mounting step, it is possible to make a switch from driving control by remote control to driving control by the moving object.

(6) In the moving object of the above-described aspect, the step may include a speed detection device mounting step where a process of adding a speed detection device as the element to the moving object is performed, the speed detection device including at least one of a vehicle speed sensor, a wheel speed sensor, an acceleration sensor, and a yaw rate sensor, the speed detection device being capable of acquiring speed information about a speed of a vehicle as the moving object. When the completion of the speed detection device mounting step is detected, the control content change unit may change the content in such a manner as to implement driving control using the speed information detected by the added speed detection device.

According to the moving object of this aspect, along with the completion of the speed detection device mounting step, it is possible to make self location estimation or implement feedback control over a vehicle speed using the detected speed information.

(7) In the moving object of the above-described aspect, the step may include an adjusting step including at least one of a wheel alignment adjusting step and a suspension adjusting step, the wheel alignment adjusting step being a step where a process of changing a wheel alignment as the element of a vehicle as the moving object is performed, the suspension adjusting step being a step where a process of changing a suspension as the element of the vehicle is performed. When the completion of the adjusting step is detected, the control content change unit may change the content in such a manner as to increase an upper limit of a running speed of the moving object.

According to the moving object of this aspect, along with the completion of the adjusting step, it is possible to increase a moving speed of the moving object, thereby achieving improvement of the productivity of the moving object.

(8) The moving object of the above-described aspect may further comprise: an operation unit for manual driving of the moving object; and a storage device storing a threshold set in advance using the amount of operation on the operation unit, the threshold being used for judging whether to give preference to driving control using the operation unit over driving control by the remote control when the driving control by the remote control and the driving control using the operation unit are implemented simultaneously. The process completion detector may detect the completion of a process by a step prior to a predetermined step where a worker possibly touches the operation unit, the prior step being of the at least one step. When the completion of the process by the prior step is detected, the control content change unit may change the content in such a manner as to relax the threshold to a value that imposes difficulty in giving preference to the driving control using the operation unit.

According to the moving object of this aspect, it is possible to reduce or prevent trouble of unintentionally stopping moving of the moving object by remote control due to erroneous touch with the operation unit by a worker or the like during the moving of the moving object.

(9) In the moving object of the above-described aspect, the driving controller generates a control signal for moving the moving object by the unmanned driving and implements driving control over the moving object in response to the control signal during the course of manufacture.

(10) According to a second aspect of the present disclosure, a server is provided. The server comprises: a remote controller that causes a moving object manufactured in a factory to run by remote control, the moving object comprising a communication unit, and a driving controller, the communication unit being for receiving a control command for the remote control, the driving controller implementing driving control over the moving object in response to the received control command during a course of manufacture in the factory for manufacture of the moving object; a manufacturing information acquisition unit that acquires manufacturing information including a progress status of a process by at least one step included in the course of manufacture; and a control content change instruction unit that instructs the moving object to change a content in control over the moving object when completion of the process is detected.

The server of this aspect makes it possible to appropriately change a content in the control over the moving object in response to a progress status of the course of manufacture of the moving object managed by the server. This allows driving control over the moving object to be implemented favorably for each step by remote control.

(11) In the server of the above-described aspect, the manufacturing information acquisition unit may acquire the completion of a process of adding an element to the moving object or a process of changing an element provided in the moving object performed by the at least one step. When the completion is acquired, the control content change instruction unit may instruct the moving object to change the content in such a manner as to implement the control using the element added to the moving object or the element in the moving object changed as a result of the completion.

The server of this aspect makes it possible to appropriately use the element added to the moving object or the changed element in the moving object in response to a progress status of the course of manufacture of the moving object managed by the server, allowing each moving object to fulfill performance properly during moving by remote control.

(12) In the server of the above-described aspect, the manufacturing information acquisition unit may acquire the completion of a process by a step prior to a step where a worker will possibly touch an operation unit for manual driving of the moving object, the prior step being of the at least one step. When the completion of the process by the prior step is acquired, the control content change instruction unit may instruct the moving object to change the content in such a manner as to relax a threshold to a value that imposes difficulty in giving preference to driving control using the operation unit, the threshold being used for judging whether to give preference to the driving control using the operation unit over driving control by the remote control when the driving control using the operation unit and the driving control by the remote control are implemented simultaneously.

According to the server of this aspect, it is possible to reduce or prevent trouble of unintentionally stopping moving of the moving object by remote control due to erroneous touch with the operation unit by a worker or the like during the moving of the moving object.

(13) The server of the above-described aspect may further comprise an abnormality countermeasure unit that takes an abnormality countermeasure including at least one of stop of manufacture of the moving object and notification when the driving control using the operation unit is implemented preferentially after the threshold is relaxed.

According to the server of this aspect, taking the abnormality countermeasure makes it possible to reduce or prevent risk to be caused by relaxing the threshold.

(14) According to a third aspect of the present disclosure, a method of manufacturing a moving object is provided. The manufacturing method comprises: causing a moving object to run by unmanned driving during a course of manufacture in a factory for manufacture of the moving object; acquiring manufacturing information including a progress status of a process by at least one step included in the course of manufacture; and instructing the moving object to change a content in control over the moving object when completion of the process is detected.

The method of manufacturing the moving object of this aspect allows a content in the control over the moving object to be changed each time a process by a step is completed, making it possible to implement driving control over the moving object favorably for each step by remote control or autonomous control.

The present disclosure is feasible in various aspects other than the moving object, the server, and the method of manufacturing the moving object. For example, the present disclosure may be realized in aspects including a system, a method of conveying a moving object, a method of changing control over a moving object or adding control to the moving object, a method of controlling a moving object, a computer program realizing such a control method, and a non-transitory recording medium storing such a computer program.

BRIEF DESCRIPTION OF THE DRAWINGS

FIG. 2 is a block diagram showing an internal functional configuration of a server;

FIG. 5 is an explanatory view conceptually showing a control content change table;

FIG. 9 is a block diagram showing an internal functional configuration of an ECU provided at a vehicle according to the second embodiment;

FIG. 11 is a block diagram showing an internal functional configuration of a server according to the third embodiment;

FIG. 15 is an explanatory view showing a schematic configuration of a system according to a fifth embodiment;

DETAILED DESCRIPTION

A. First Embodiment

Figure 1:
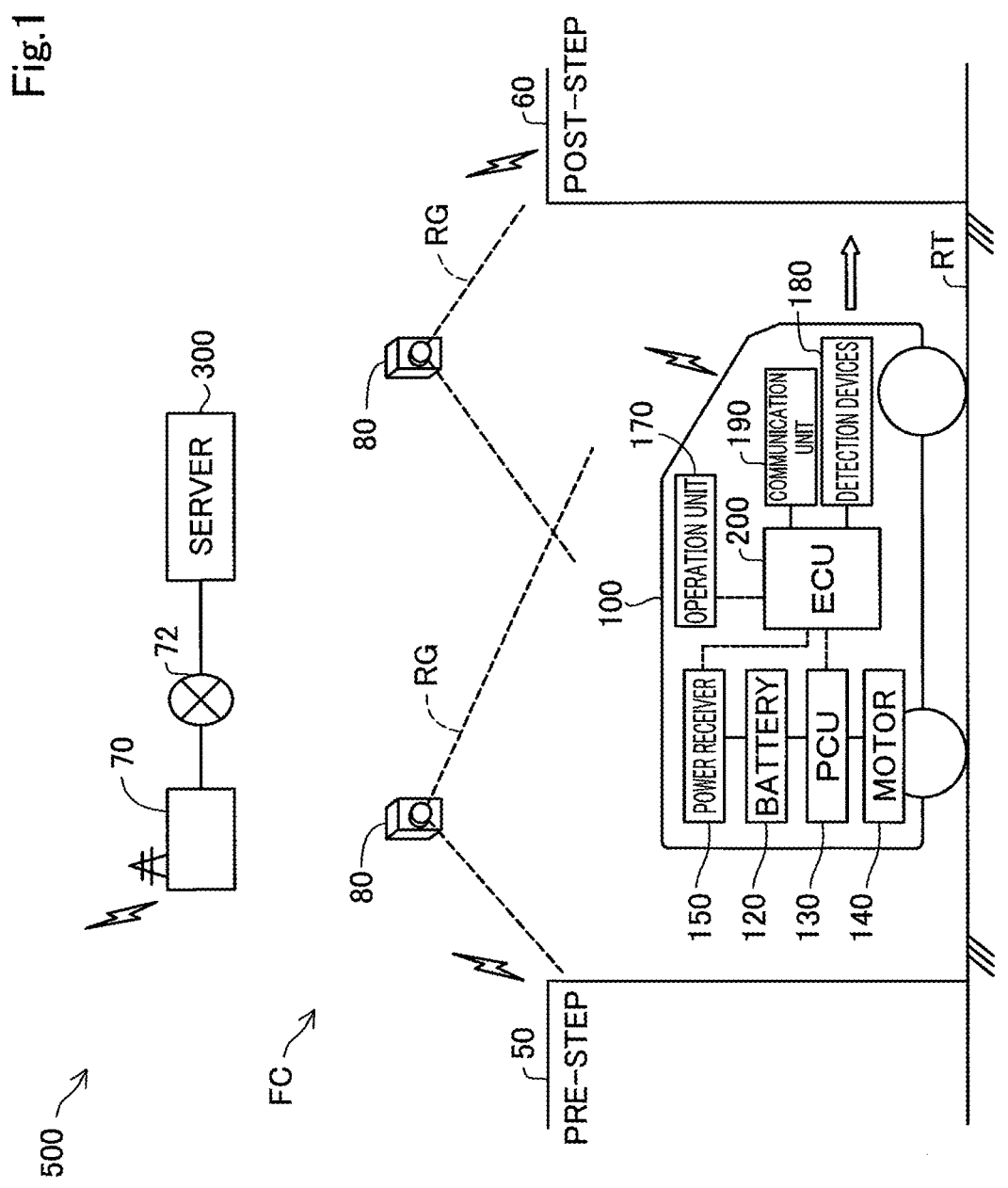
FIG. 1 is an explanatory view showing schematic configurations of a vehicle and a system according to a first embodiment.

FIG. 1 is an explanatory view showing schematic configurations of a vehicle 100 and a system 500 according to a first embodiment. The system 500 of the present embodiment is configured as a remote automatic driving system. The system 500 is capable of causing the vehicle 100 as a moving object to run automatically by remote control during a course of manufacture in a factory FC for manufacture of the vehicle 100. In the present specification, a state finished as a product, and a state as a semifinished product and a state as an in-process item during manufacture are collectively called a "vehicle."

In the present disclosure, the "moving object" means an object capable of moving, and is a vehicle or an electric vertical takeoff and landing aircraft (so-called flying-automobile), for example. The vehicle may be a vehicle to run with a wheel or may be a vehicle to run with a continuous track, and may be a passenger car, a track, a bus, a two-wheel vehicle, a four-wheel vehicle, a construction vehicle, or a combat vehicle, for example. The vehicle includes a battery electric vehicle (BEV), a gasoline automobile, a hybrid automobile, and a fuel cell automobile. When the moving object is other than a vehicle, the term "vehicle" or "car" in the present disclosure is replaceable with a "moving object" as appropriate, and the term "run" is replaceable with "move" as appropriate.

The vehicle 100 is configured to be capable of running by unmanned driving. The "unmanned driving" means driving independent of running operation by a passenger. The running operation means operation relating to at least one of "run," "turn," and "stop" of the vehicle 100. The unmanned driving is realized by automatic remote control or manual remote control using a device provided outside the vehicle 100 or by autonomous control by the vehicle 100. A passenger not involved in running operation may be on-board a vehicle running by the unmanned driving. The passenger not involved in running operation includes a person simply sitting in a seat of the vehicle 100 and a person doing work such as assembly, inspection, or operation of switches different from running operation while on-board the vehicle 100. Driving by running operation by a passenger may also be called "manned driving."

In the present specification, the "remote control" includes "complete remote control" by which all motions of the vehicle 100 are completely determined from outside the vehicle 100, and "partial remote control" by which some of the motions of the vehicle 100 are determined from outside the vehicle 100. The "autonomous control" includes "complete autonomous control" by which the vehicle 100 controls a motion of the vehicle 100 autonomously without receiving any information from a device outside the vehicle 100, and "partial autonomous control" by which the vehicle 100 controls a motion of the vehicle 100 autonomously using information received from a device outside the vehicle 100.

As shown in FIG. 1, the factory FC is provided with a pre-step 50, a post-step 60, and a track RT for the vehicle 100. The track RT is a conveyance zone for the vehicle 100 in the factory FC connecting the pre-step 50 and the post-step 60 to each other. Each of a step in the factory FC and a step during the course of manufacture is not limited to a case where the step exists in one building, at one site, or at one address, etc. Each of a step in the factory FC and a step during the course of manufacture may extend across a plurality of buildings, a plurality of sites, or a plurality of addresses, for example. "Running of the vehicle 100 in the factory FC" includes not only a case where the vehicle 100 runs along a track in a factory existing in one place but also cases where the vehicle 100 runs in conveyance zones between a plurality of factories at a plurality of places and between a plurality of steps at a plurality of places. "Running of the vehicle 100 in the factory FC" includes a case where the vehicle 100 runs not only on a private road but also on a public road for moving between factories located at a plurality of places and for moving between steps at a plurality of places, for example.

The pre-step 50 and the post-step 60 are various types of steps belonging to the course of manufacture of the vehicle 100. The course of manufacture of the vehicle 100 may include a process of adding an element to the vehicle 100 and a process of changing an element provided in the vehicle 100. The "process" means conducting particular work on the vehicle 100. The process may either be manual work to be conducted by a worker, for example, or automatic work to be conducted by a facility, for example. For example, the "element of the vehicle 100" includes an element relating to a part or a device to be mounted on the vehicle 100 such as a type, a parameter, a location, or a state of the part or the device to be mounted on the vehicle 100, and an element relating to control over the vehicle 100 such as a control parameter or a control program involved in each type of control including driving control over the vehicle 100 for operating each part of the vehicle 100. When a process by a step is completed, a new element may be added to the vehicle 100 or an element belonging to the vehicle 100 may be changed.

The pre-step 50 includes a mounting step of mounting a part of the vehicle 100 on the vehicle 100 such as detection devices 180, and an adjusting step of adjusting the part, etc. mounted on the vehicle 100, for example. The post-step 60 is an inspection step on the vehicle 100, for example. The vehicle 100 having been delivered from the pre-step 50 becomes an item to be processed in the post-step 60 and runs by remote control along the track RT to the post-step 60 as a running destination. After being subjected to the inspection step as the post-step 60, the vehicle 100 is finished as a product and runs to a standby place in the factory FC for waiting to be shipped. Then, the vehicle 100 is shipped to a destination country defined for each vehicle 100. The pre-step 50 and the post-step 60 are not limited to the mounting step, the adjusting step, and the inspection step but various types of steps are adoptable on the assumption that the vehicle 100 after processed by the pre-step 50 and the post-step 60 is capable of running by unmanned driving.

Each of steps in the factory FC including the pre-step 50 and the post-step 60 is equipped with a step management device for managing manufacturing information about the vehicle 100. The "manufacturing information" includes a progress status of a process by the step, the number of in-process items, the number of products being processed, a manufacturing period in each step, start time and finish time of a process by each step, vehicle identification information about the vehicle 100 present in each step, a scheduled manufacture volume per day, and a target manufacturing period in a step for manufacturing one vehicle 100, for example. The target manufacturing period may also be called "takt time." The "vehicle identification information" means various types of information with which the vehicle 100 is individually identifiable. The vehicle identification information includes ID information given to each vehicle 100 such as a vehicle identification number (VIN), specification information about the vehicle 100 such as a vehicle type, a color, and a shape, and production management information about the vehicle 100 such as the name of a step where the vehicle 100 is being processed, for example. The vehicle identification information may be acquired from a radio frequency-identification (RF-ID) tag given to the vehicle 100 via short-distance radio communication, for example. The step management device in each step acquires a manufacturing status about the vehicle 100 in each step from a camera or a sensor not shown in the drawings provided at each step, and transmits the acquired manufacturing status to a server 300 and the vehicle 100. The manufacturing status in each step may be transmitted to a production management device that collectively manages manufacturing statuses in each step in the factory FC.

The system 500 includes a vehicle detector and the server 300. The vehicle detector acquires vehicle information including at least one of an image of the vehicle 100 and the location of the vehicle 100. The detected vehicle information is used for remote control by the system 500. The "vehicle information" may further include a running direction of the vehicle 100 or the position of the vehicle 100. A running direction of the vehicle 100 or the position of the vehicle 100 may be acquired by detecting the shape of the vehicle 100 or a part of the vehicle 100, for example. Only the location of the vehicle 100 may be detected by the vehicle detector, and a running direction or the position of the vehicle 100 may be estimated using temporal change in the vehicle 100.

In the present embodiment, a camera 80 is used as the vehicle detector. The camera 80 is connected to the server 300 in a manner communicable via radio communication or wire communication. The camera 80 has an imaging unit such as a charge coupled device (CCD) image sensor or a complementary metal oxide semiconductor (CMOS) image sensor, and an optical system. The camera 80 is fixed at a location allowing the camera 80 to capture images of the track RT and the vehicle 100 running along the track RT, and acquires an image of the vehicle 100 as the vehicle information. It is possible to acquire various types of vehicle information available for remote control such as the location of the vehicle 100 relative to the track RT and the position of the vehicle 100 by performing image analysis on the image acquired by the camera 80. Using the image from the camera 80 installed in the factory FC makes it possible to implement automatic running of the vehicle 100 by remote control without using a detector mounted on the vehicle 100 such as a camera, a millimeter wave radar, or light detection and ranging (LiDAR). As long as the vehicle detector is capable of acquiring the location of the vehicle 100, the vehicle detector does not have to acquire an image of the vehicle 100. In this case, the vehicle detector to be used may be any type of detector capable of detecting the location of the vehicle 100 instead of acquiring an image of the vehicle 100 that may be LiDAR, an infrared sensor, a laser sensor, an ultrasonic sensor, or a millimeter wave radar, for example.

Figure 2:
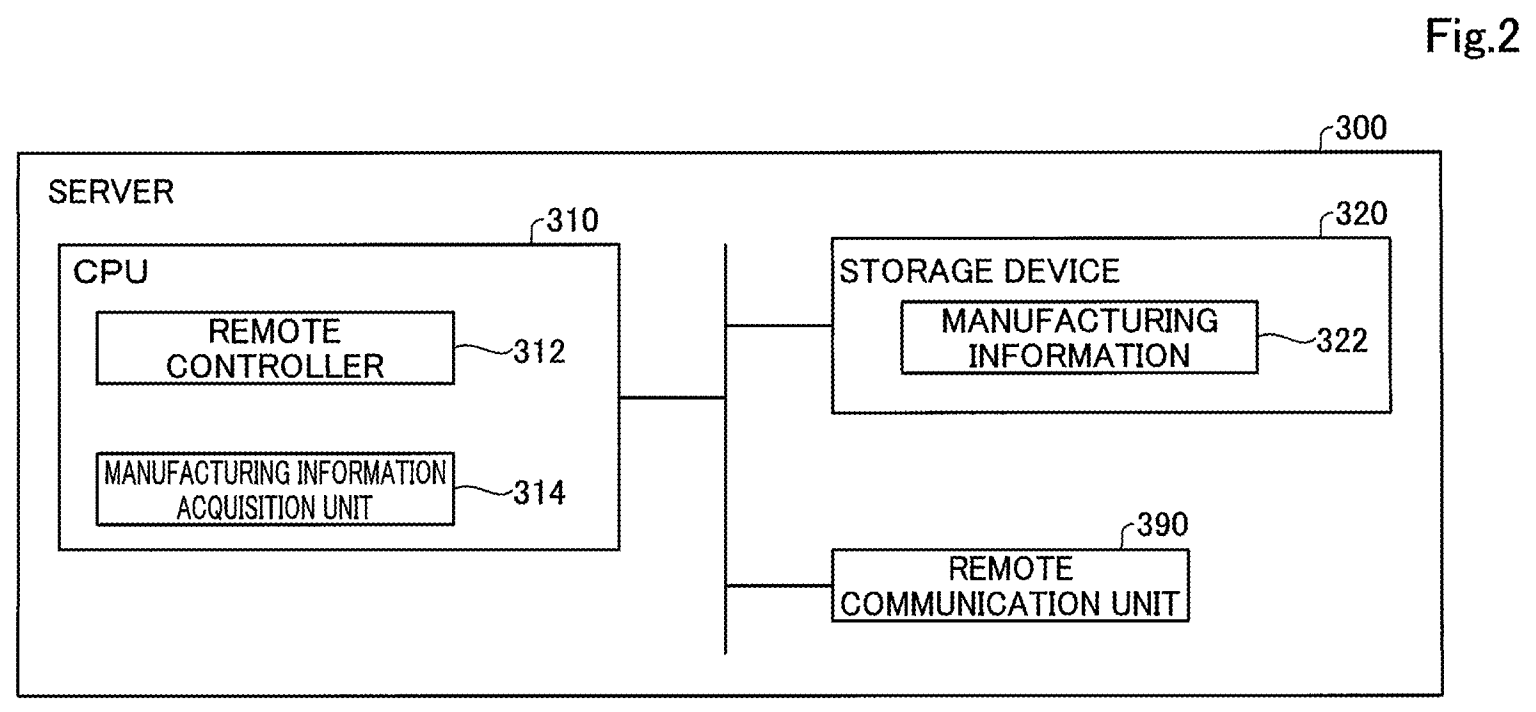

FIG. 2 is a block diagram showing an internal functional configuration of the server 300. The server 300 includes a CPU 310 as a central processing unit, a storage device 320, and a remote communication unit 390. These units are connected to each other via an internal bus or an interface circuit, for example. The remote communication unit 390 is a circuit for communicating with the vehicle 100 and others via a network 72.

The storage device 320 is a RAM, a ROM, a hard disk drive (HDD), or a solid state drive (SSD), for example. The storage device 320 stores various types of programs for realizing functions provided in the present embodiment. The CPU 310 executes a computer program stored in the storage device 320. This causes the CPU 310 to function as a remote controller 312, a manufacturing information acquisition unit 314, and others. Some or all the functions of these units may be configured by a hardware circuit.

The manufacturing information acquisition unit 314 acquires manufacturing information 322 from the step management device provided at each of steps or from the production management device that collectively manages manufacturing statuses in each step, for example. The manufacturing information acquisition unit 314 may acquire the manufacturing information 322 from each vehicle 100. The acquired manufacturing information 322 is stored in the storage device 320. This allows the server 300 to acquire a progress status of a process by each step on the vehicle 100 during the course of manufacture individually about each vehicle 100.

The remote controller 312 implements automatic running of the vehicle 100 in the factory FC by remote control. More specifically, the remote controller 312 transmits a control signal requesting remote control to the vehicle 100 via the remote communication unit 390. In the present embodiment, this control signal is specifically a running control signal described later. When the vehicle 100 accepts the request for remote control, an ECU 200 realizes driving control responsive to the control signal. As a result, the vehicle 100 runs automatically. By conveying the vehicle 100 using such running by unmanned driving, it becomes possible to reduce or prevent human-induced accidents during running of the vehicle 100.

In other embodiments, if the remote controller 312 causes the vehicle 100 to run by remote control, the remote controller 312 does not have to transmit a running control signal to the vehicle 100 but is required only to transmit a control command to the vehicle 100. The control command includes at least one of a running control signal and generation information for generating the running control signal. The generation information to be used is vehicle location information, a route, or a target location described later, for example.

As shown in FIG. 1, the vehicle 100 includes an operation unit 170, a vehicle communication unit 190, a power receiver 150, a battery 120, a PCU 130, a motor 140, the detection devices 180, and the electronic control unit (ECU) 200. The operation unit 170 is an accelerator, a handle (steering wheel), or a brake, for example. The operation unit 170 accepts manual operation for fulfilling functions of the vehicle 100 including "run," "turn," and "stop." The manual operation corresponds to the running operation by a driver described above.

The vehicle communication unit 190 is a radio communication device such as a dongle, for example, mounted on the vehicle 100. The vehicle communication unit 190 has a communication function of making communication using controller area network (CAN) communication used for control over the vehicle 100 and others, and using diagnosis communication available for diagnosis of failure, etc. The CAN communication is a communication standard allowing multidirectional transmission or reception. The diagnosis communication is a communication standard allowing request and response to be associated with each other on a one-to-one basis. The vehicle communication unit 190 makes radio communication via an access point 70 in the factory FC, for example, with devices outside the vehicle 100 such as the server 300 connected to the network 72 and the production management device not shown in the drawings for managing production information about the vehicle 100 collectively. In the following, the vehicle communication unit 190 will also be called a communication unit simply.

The power receiver 150 converts alternating-current power supplied from an external power feeder, for example, to direct-current power using a rectifier, and supplies the direct-current power to the battery 120 as a load. The battery 120 is a chargeable secondary battery such as a lithium-ion battery or a nickel-hydrogen battery, for example. The battery 120 is a high-voltage battery of several hundreds of volts, for example, and stores power to be used for running of the vehicle 100. When the battery 120 receives power supplied to the power receiver 150 from the external power feeder and regenerative power generated by the motor 140, the battery 120 is charged.

The motor 140 is an alternating-current synchronous motor, for example, and functions as an electric motor and a generator. When the motor 140 functions as the electric motor, the motor 140 is driven by the power stored in the battery 120 as a power source. Output from the motor 140 is transmitted through a decelerator and an axle to a wheel. During deceleration of the vehicle 100, the motor 140 functions as the generator using the rotation of the wheel to generate regenerative power. The power control unit (PCU) 130 is electrically connected between the motor 140 and the battery 120.

The PCU 130 has an inverter, a boost converter, and a DC/DC converter. The inverter converts direct-current power supplied from the battery 120 to alternating-current power, and supplies the converted alternating-current power to the motor 140. The inverter converts regenerative power supplied from the motor 140 to direct-current power, and supplies the direct-current power to the battery 120. The boost converter boosts a voltage at the battery 120 when the power stored in the battery 120 is supplied to the motor 140. The DC/DC converter steps down the voltage at the battery 120 when the power stored in the battery 120 is supplied to an auxiliary, for example.

The detection devices 180 are sensors provided at the vehicle 100. The detection devices 180 are mounted on the vehicle 100 in various steps included in the pre-step 50, for example. The detection devices 180 include an object detection device, a speed detection device, and others, for example. The object detection device is a radar device or a vehicle-mounted camera, for example. The radar device includes a device such as LiDAR or a millimeter wave radar for detecting the presence or absence of a target around the vehicle 100, a distance to the target, or the location of the target, etc. The vehicle-mounted camera includes various types of cameras such as a stereo camera and a monocular camera capable of capturing images of a target around vehicle 100. The speed detection device is a vehicle speed sensor, a wheel speed sensor, an acceleration sensor, or a yaw rate sensor, for example. The detection devices 180 are not limited to the object detection device and the speed detection device but may include various types of general sensors such as a rudder angle sensor.

Figure 3:
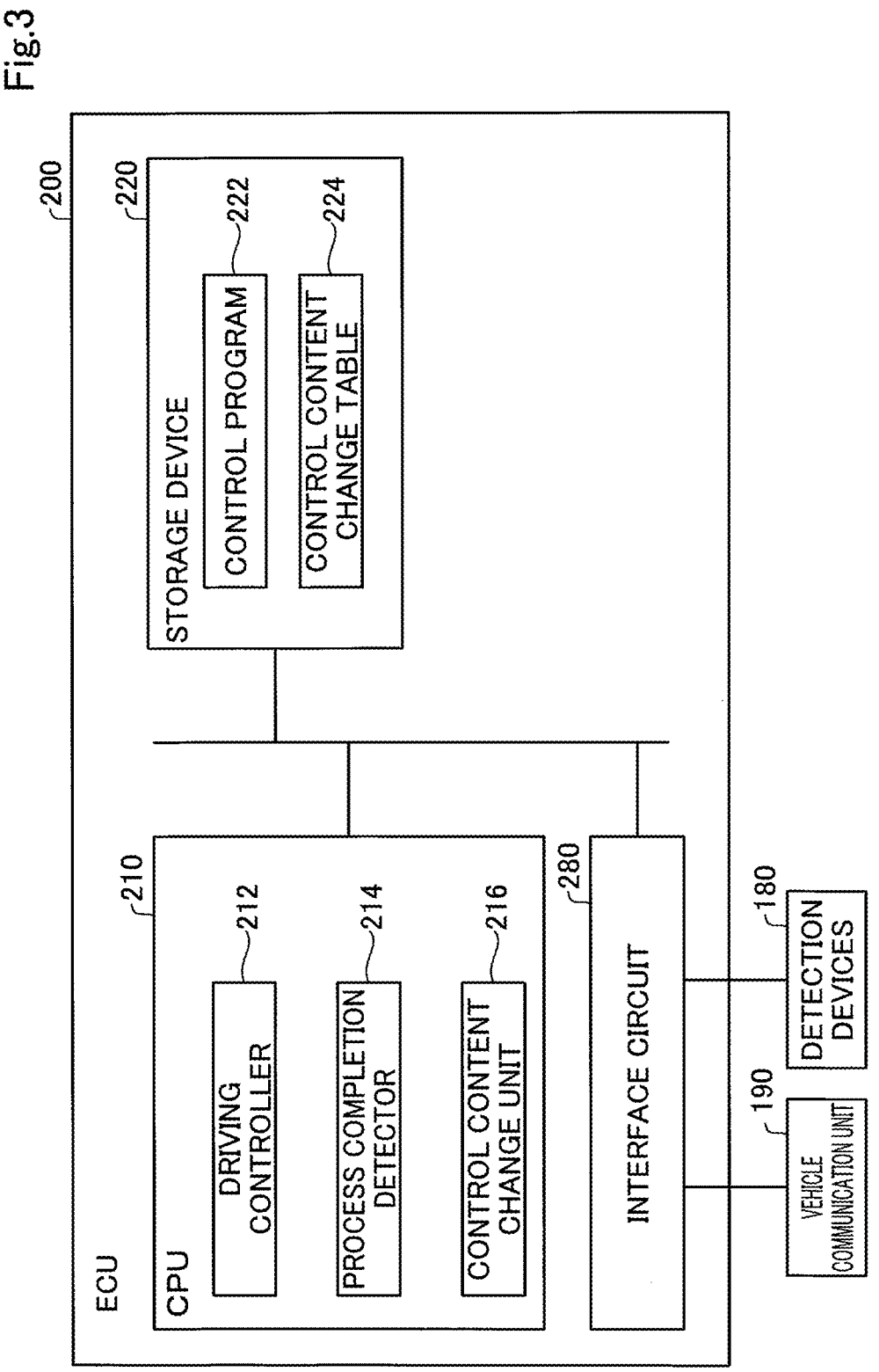
FIG. 3 is a block diagram showing an internal functional configuration of an ECU.

FIG. 3 is a block diagram showing an internal functional configuration of the ECU 200. The ECU 200 is mounted on the vehicle 100 and implements various types of control over the vehicle 100. The ECU 200 includes a storage device 220 that may be a hard disk drive (HDD), a solid state drive (SDD), an optical recording medium, or a semiconductor memory, a CPU 210 as a central processing unit, and an interface circuit 280. The detection devices 180, the vehicle communication unit 190, and others are connected to the interface circuit 280. The storage device 220 stores a control program 222 and a control content change table 224.

The control program 222 is a computer program for causing the CPU 210 to function as a driving controller 212. The control program 222 contains a control parameter. The control content change table 224 shows association between a step and a content in the control program 222 to be added or changed after completion of the step.

The storage device 220 stores various types of programs for realizing functions provided in the present embodiment. The CPU 210 executes various computer programs stored in the storage device 220 to realize various types of functions including the driving controller 212, a process completion detector 214, and a control content change unit 216. Furthermore, the ECU 200 controls the PCU 130 to control transfer of power between the battery 120 and the motor 140.

The process completion detector 214 detects completion of a process by a step included in the course of manufacture. In the present embodiment, the process completion detector 214 acquires completion of a process by each step on its own vehicle from a sensor, a camera, or the like provided in this step. The process completion detector 214 may acquire the completion of the process by each step on the own vehicle from the step management device provided at each of steps, from the production management device that collectively manages manufacturing statuses in each step, or from the server 300 having acquired such pieces of information.

If the process completion detector 214 detects the completion of a process by each step, the control content change unit 216 changes a content in control over the vehicle 100. More specifically, the control content change unit 216 changes a content in the control over the vehicle 100 in such a manner as to implement the control using an element added to the vehicle 100 or an element in the vehicle 100 changed as a result of the process by the detected step. In the present embodiment, the control content change unit 216 rewrites the control program 222 in response to each completion of a process by a step by referring to the control content change table 224. As a result, the control content in the control program 222 is changed to a control content using an element added to the vehicle 100 or a changed element in the vehicle 100. The "rewriting of the control program 222" includes rewriting of a control parameter. If a completed step does not involve addition of an element to the vehicle 100 or change of an element in the vehicle 100, the control content change unit 216 is not required to change a content in the control over the vehicle 100.

The driving controller 212 implements driving control over the vehicle 100. The "driving control" is adjustment of an acceleration, a speed, and a rudder angle, for example. Under the driving control by remote control, the driving controller 212 controls each actuator mounted on the vehicle 100 in response to a request for the remote control received from the server 300 via the vehicle communication unit 190.

Figure 4A:
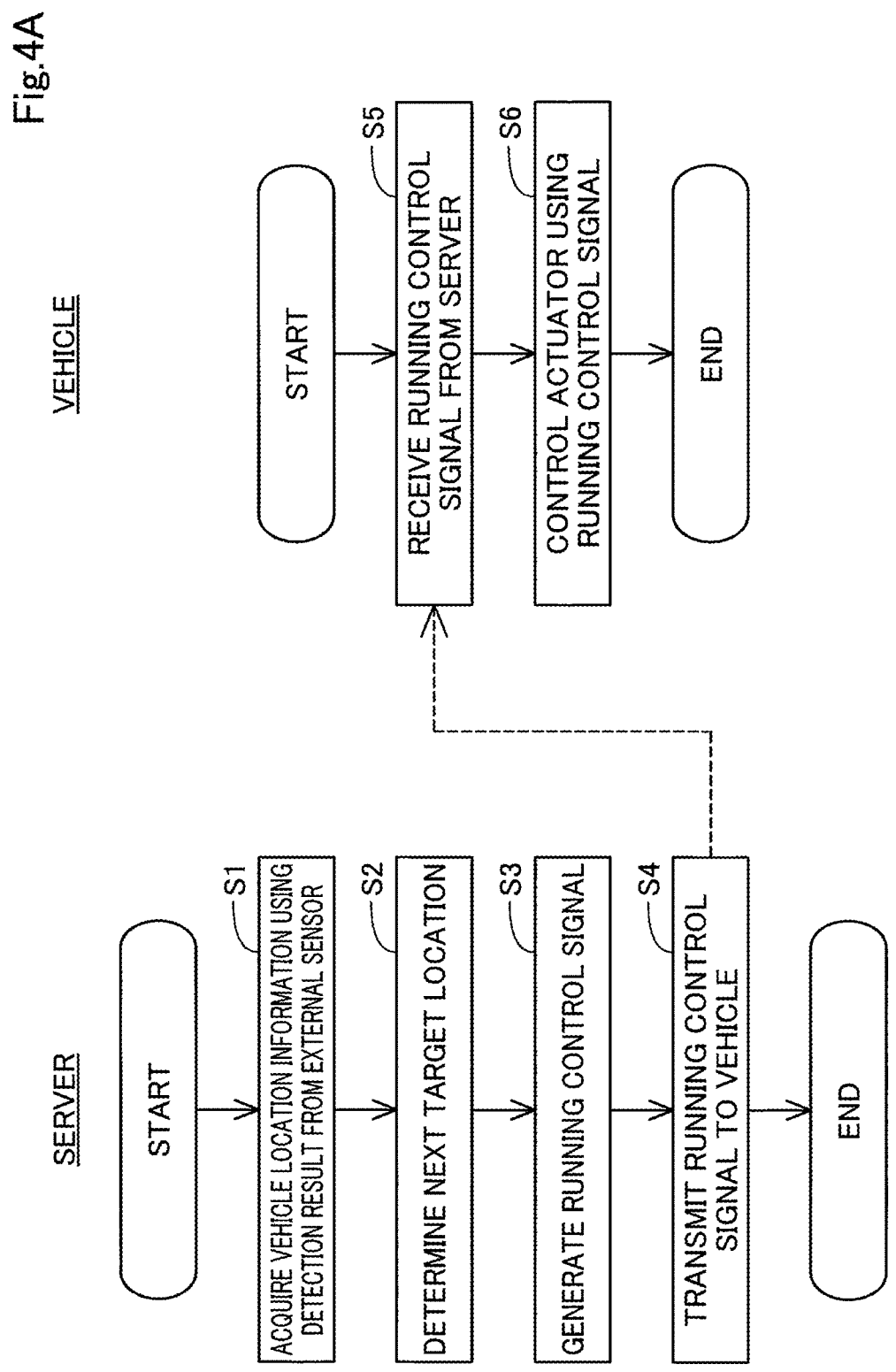
FIG. 4A is a flowchart showing a processing procedure of running control over the vehicle according to the first embodiment.

FIG. 4A is a flowchart showing a processing procedure for running control of the vehicle 100 in the first embodiment. In step S1, the server 300 acquires vehicle location information using detection result output from an external sensor. The external sensor is located outside the vehicle 100. The vehicle location information is locational information as a basis for generating a running control signal. In the present embodiment, the vehicle location information includes the location and orientation of the vehicle 100 in a reference coordinate system of the factory. In the present embodiment, the reference coordinate system of the factory is a global coordinate system and a location in the factory can be expressed by X, Y, and Z coordinates in the global coordinate system. In the present embodiment, the external sensor is the camera 80 that is disposed in the factory and outputs a captured image as detection result. In step S1, the server 300 acquires the vehicle location information using the captured image acquired from the camera 80 as the external sensor.

More specifically, in step S1, the server 300 for example, determines the outer shape of the vehicle 100 from the captured image, calculates the coordinates of a positioning point of the vehicle 100 in a coordinate system of the captured image, namely, in a local coordinate system, and converts the calculated coordinates to coordinates in the global coordinate system, thereby acquiring the location of the vehicle 100. The outer shape of the vehicle 100 in the captured image may be detected by inputting the captured image to a detection model using artificial intelligence, for example. The detection model is prepared in the system 500 or outside the system 500. The detection model is stored in advance in a memory of the server 300, for example. An example of the detection model is a learned machine learning model that was learned so as to realize either semantic segmentation or instance segmentation. For example, a convolution neural network (CNN) learned through supervised learning using a learning dataset is applicable as this machine learning model. The learning dataset contains a plurality of training images including the vehicle 100, and a label showing whether each region in the training image is a region indicating the vehicle 100 or a region indicating a subject other than the vehicle 100, for example. In training the CNN, a parameter for the CNN is preferably updated through backpropagation in such a manner as to reduce error between output result obtained by the detection model and the label. The server 300 can acquire the orientation of the vehicle 100 through estimation based on the direction of a motion vector of the vehicle 100 detected from change in location of a feature point of the vehicle 100 between frames of the captured images using optical flow process, for example.

In step S2, the server 300 determines a target location to which the vehicle 100 is to move next. In the present embodiment, the target location is expressed by X, Y, and Z coordinates in the global coordinate system. The memory of the server 300 contains a reference route stored in advance as a route along which the vehicle 100 is to run. The route is expressed by a node indicating a departure place, a node indicating a way point, a node indicating a destination, and a link connecting nodes to each other. The server 300 determines the target location to which the vehicle 100 is to move next using the vehicle location information and the reference route. The server 300 determines the target location on the reference route ahead of a current location of the vehicle 100.

In step S3, the server 300 generates a running control signal for causing the vehicle 100 to run toward the determined target location. In the present embodiment, the running control signal includes an acceleration and a steering angle of the vehicle 100 as parameters. The server 300 calculates a running speed of the vehicle 100 from transition of the location of the vehicle 100 and makes comparison between the calculated running speed and a target speed of the vehicle 100 determined in advance. If the running speed is lower than the target speed, the server 300 generally determines an acceleration in such a manner as to accelerate the vehicle 100. If the running speed is higher than the target speed as, the server 300 generally determines an acceleration in such a manner as to decelerate the vehicle 100. If the vehicle 100 is on the reference route, server 300 determines a steering angle and an acceleration in such a manner as to prevent the vehicle 100 from deviating from the reference route. If the vehicle 100 is not on the reference route, in other words, if the vehicle 100 deviates from the reference route, the server 300 determines a steering angle and an acceleration in such a manner as to return the vehicle 100 to the reference route. In other embodiments, the running control signal may include the speed of the vehicle 100 as a parameter instead of or in addition to the acceleration of the vehicle 100.

In step S4, the server 300 transmits the generated running control signal to the vehicle 100. The server 300 repeats the acquisition of vehicle location information, the determination of a target location, the generation of a running control signal, the transmission of the running control signal, and others in a predetermined cycle.

In step S5, the vehicle 100 receives the running control signal transmitted from the server 300. In step S6, the vehicle 100 controls an actuator of the vehicle 100 using the received running control signal, thereby causing the vehicle 100 to run at the acceleration and the steering angle indicated by the running control signal. The vehicle 100 repeats the reception of a running control signal and the control over the actuator in a predetermined cycle. According to the system 500 in the present embodiment, it becomes possible to move the vehicle 100 without using a transport unit such as a crane or a conveyor.

Figure 4B:
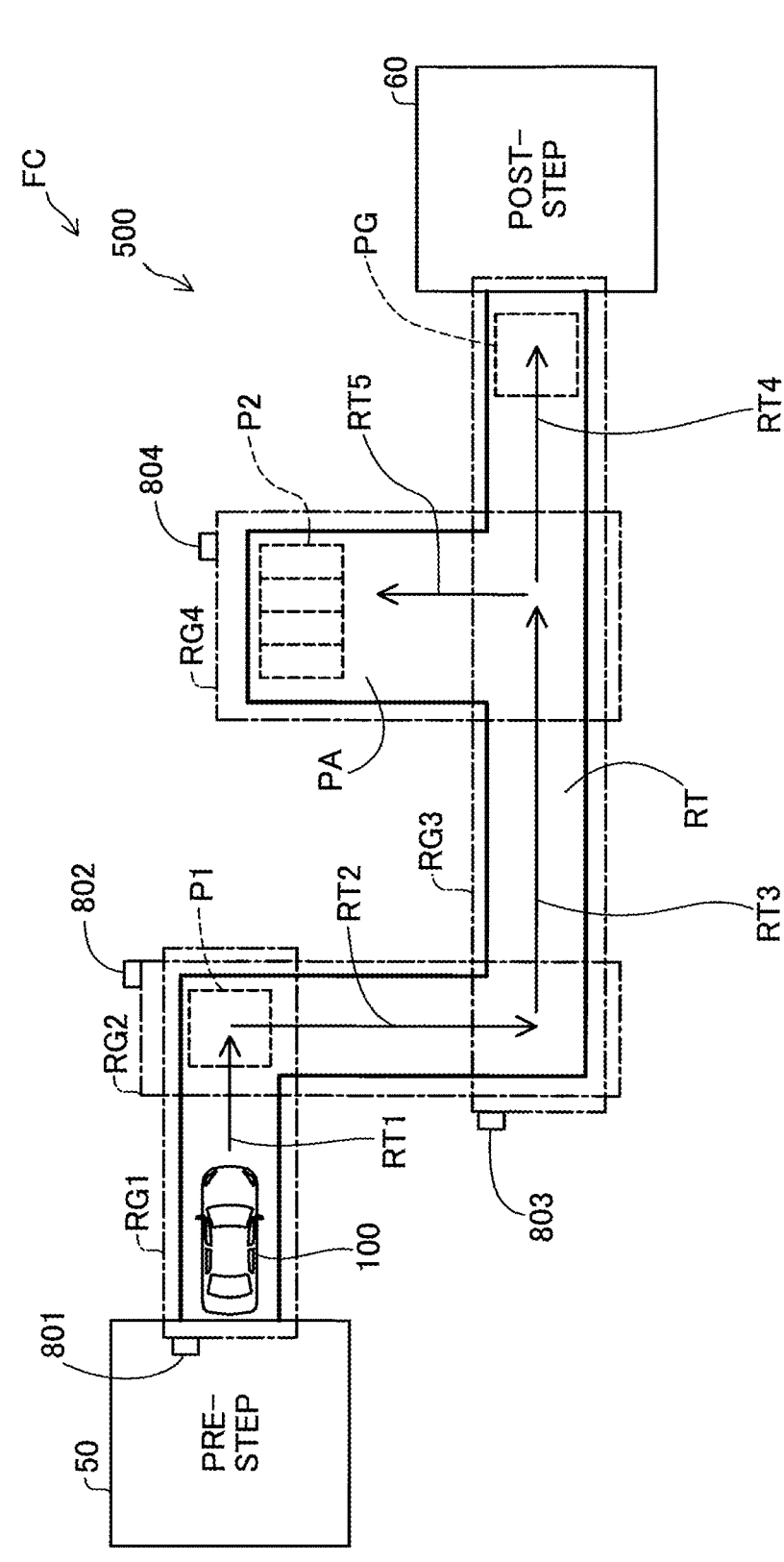
FIG. 4B is an explanatory view showing automatic driving control over the vehicle by remote control by a remote controller.

FIG. 4B is an explanatory view showing automatic driving control over the vehicle 100 by remote control by the remote controller 312. In the illustration in FIG. 4B, the track RT includes a first track RT1, a second track RT2, a third track RT3, and a fourth track RT4 continuous with each other. The first track RT1 and the second track RT2 are connected to each other across a right-angled curve. A parking area PA is connected between the third track RT3 and the fourth track RT4. In normal time, the remote controller 312 causes the vehicle 100 to run along the track RT to a loading location PG for loading into the post-step 60.

As shown in FIG. 4B, the camera 80 as the vehicle detector acquires images of the vehicle 100 on the track RT and in the parking area PA viewed from above. The number of the cameras 80 is set by giving consideration to angles of view of the cameras 80, etc. to a number allowing imaging of the track RT and the parking area PA entirely. In the illustration in FIG. 4B, the camera 80 includes a camera 801 allowing imaging of a range RG1 covering the first track RT1 entirely, a camera 802 allowing imaging of a range RG2 covering the second track RT2 entirely, a camera 803 allowing imaging of a range RG3 covering the third track RT3 and the fourth track RT4 entirely, and a camera 804 allowing imaging of a range RG4 covering the parking area PA entirely. The camera 80 may acquire not only an image captured from above the vehicle 100 but also an image captured from the front, back, or side of the vehicle 100, for example. Cameras for acquiring such images may be used freely in combination.

The track RT has a virtual target route set in advance as a route along which the vehicle 100 is to run under remote control. In the present embodiment, the target route corresponds to the above-described reference route. The remote controller 312 causes the ECU 200 to implement driving control over the vehicle 100 while analyzing images at a predetermined time interval about the track RT and the vehicle 100 acquired by the camera 80. The remote controller 312 makes a request for remote control to the vehicle 100 to sequentially adjust the location of the vehicle 100 relative to the target route, thereby allowing the vehicle 100 to run along the target route. For the remote control, an image of the entire vehicle 100 may be used or an image of a part of the vehicle 100 such as an alignment mark given to the vehicle 100 may be used.

The cameras 80 are configured in such a manner that, at a connecting location between tracks such as a location P1 shown in FIG. 4B, the angles of view of the cameras 80 corresponding to the respective connected tracks overlap each other. In the example of the location P1, the angle of view of the camera 801 corresponding to the first track RT1 and the angle of view of the camera 802 corresponding to the second track RT2 overlap each other. The vehicle 100 having been delivered from the pre-step 50 runs to the location P1 by remote control using an image captured by the camera 801. When the vehicle 100 arrives at the location P1, switch is made to remote control using a captured image acquired by the camera 802 instead of the camera 801 and the vehicle 100 runs along the second track RT2. Likewise, an image captured by the camera 803 is used for running along the third track RT3 and the fourth track RT4, and an image captured by the camera 804 is used for running in the parking area PA. In this way, the remote controller 312 implements remote control over the vehicle 100 while switching a captured image to be analyzed properly on the basis of the range of the track RT. The remote controller 312 allows the vehicle 100 to shunt from the track RT by causing the vehicle 100 to run by remote control from the track RT to the parking area PA, and further allows the vehicle 100 to be parked at a parking location P2 in the parking area PA.

FIG. 5 is an explanatory view conceptually showing the control content change table 224. FIG. 5 shows "large step," "middle step," and "small step" that are categories defined for the sake of convenience. In the illustration in FIG. 5, the large step includes a mounting step of mounting parts such as the detection devices 180 on the vehicle 100, and an adjusting step of adjusting the parts, etc. mounted on the vehicle 100.

As shown in FIG. 5, the control content change table 224 shows association between a step and a content to be added to the control program 222 or a content in the control program 222 to be changed after completion of the step. The content to be added to the control program 222 or the content in the control program 222 to be changed is set in advance in such a manner as to use an element added to the vehicle 100 or an element in the vehicle 100 changed as a result of completion of a process by each step.

In the illustration in FIG. 5, the mounting step includes an object detection device mounting step of mounting an object detection device on the vehicle 100, a speed detection device mounting step of mounting a speed detection device on the vehicle 100, and a final step of the mounting step. The object detection device mounting step is a step of mounting the object detection device as an element. The object detection device mounting step includes a radar device mounting step and a vehicle-mounted camera mounting step, for example. The radar device mounting step includes an LiDAR mounting step and a millimeter wave radar mounting step, for example.

If the radar device and the vehicle-mounted camera are mounted on the vehicle 100, the control program 222 is rewritten in such a manner as to implement collision prevention control using the mounted radar device and vehicle-mounted camera. The control program 222 is rewritten in such a manner as to implement automatic running using the collision prevention control without using remote control. Specifically, the vehicle 100 is switched to automatic running by driving control by the driving controller 212 without using remote control by the remote controller 312 of the server 300. Meanwhile, even after completion of the object detection device mounting step, automatic running by remote control by the server 300 may still be employed. In this case, it is possible to use a collision detection device mounted on the vehicle 100 secondarily to prevent collision occurring during self-running conveyance by the remote controller 312 of the server 300, for example. After completion of the vehicle-mounted camera mounting step, control by which vehicle speed data is acquired using an image captured by the vehicle-mounted camera is further implemented.

The speed detection device mounting step is a step of mounting the speed detection device as an element on the vehicle 100. The speed detection device is a sensor capable of acquiring speed information about a speed of the vehicle 100. The "speed information" includes not only a vehicle speed but also various types of information about a speed of the vehicle 100 such as a wheel speed, and an acceleration, an angular speed, and an angular acceleration of the vehicle 100. In the illustration in FIG. 5, the speed detection device mounting step includes a wheel speed sensor mounting step and an acceleration sensor mounting step. Meanwhile, the speed detection device is not limited to a wheel speed sensor and an acceleration sensor but may be at least one of a wheel speed sensor, an acceleration sensor, a vehicle speed sensor, and a yaw rate sensor.

When the speed detection device mounting step is completed, the wheel speed sensor and the acceleration sensor are mounted. This mounting allows the vehicle 100 being capable of detecting wheel speed data and acceleration data as the speed information. It is possible to acquire vehicle speed data as the speed information using the acquired wheel speed data and acceleration data, and this allows the server 300 or the ECU 200 to implement automatic running using the acquired vehicle speed data. Using the acquired wheel speed data and acceleration data makes it possible to make self location estimation of the vehicle 100. Thus, it is possible to implement automatic running of the vehicle 100 using the self location estimation. In this case, the automatic running may either be automatic running of the vehicle 100 by remote control or automatic running by driving control by the driving controller 212 not using remote control.

When the final step of the mounting step is completed, namely, when mounting of all the detection devices including the object detection device and the speed detection device is completed, safe performance during automatic running of the vehicle 100 is improved by using all the mounted detection devices. Thus, it is possible to achieve increase in an upper limit of a limit value of a vehicle speed permitted during automatic running and expansion of a permissible range of a rudder angle. This increase and this expansion are exemplary control contents to be added to the control program 222 or exemplary control contents in the control program 222 to be changed.

As shown in a lower left section in FIG. 5, the adjusting step includes a wheel alignment adjusting step, a driving backlash adjusting step, a suspension adjusting step, and a step of adjusting a position of mounting of a detection device, for example. In the wheel alignment adjusting step, a process by which a position of mounting of a wheel relative to a vehicle body is adjusted as an element is performed. When the wheel alignment adjusting step is completed, it becomes for the vehicle 100 to run straight stably. Thus, it is possible to achieve increase in an upper limit of a limit value of a vehicle speed permitted during automatic running. This increase is an exemplary control content to be added to the control program 222 or an exemplary control content in the control program 222 to be changed.

The driving backlash adjusting step is a step of reducing a backlash as an element occurring in a transmission system from a motor to a wheel, for example. The suspension adjusting step is a step of adjusting a suspension as an element. The suspension adjusting step may also be called a step of mounting a suspension bush as an element. When the driving backlash adjusting step and the suspension adjusting step are completed, it becomes possible for the vehicle 100 to run stably. The step of adjusting a position of mounting of a detection device includes a step of attaching a cover to a sensor mounted in the mounting step, a step of fixing the sensor at a final location, and others. When the step of adjusting the position of mounting of the detection device is completed, accuracy of detection by the sensor is increased to improve safety and safe performance during running of the vehicle 100. Thus, when the suspension adjusting step, the driving backlash adjusting step, and the step of adjusting the position of mounting of the detection device are completed, it becomes possible to achieve increase in an upper limit of a limit value of a vehicle speed permitted during automatic running and expansion of a permissible range of a rudder angle. This increase and this expansion are exemplary control contents to be added to the control program 222 or exemplary control contents in the control program 222 to be changed.

Figure 6:
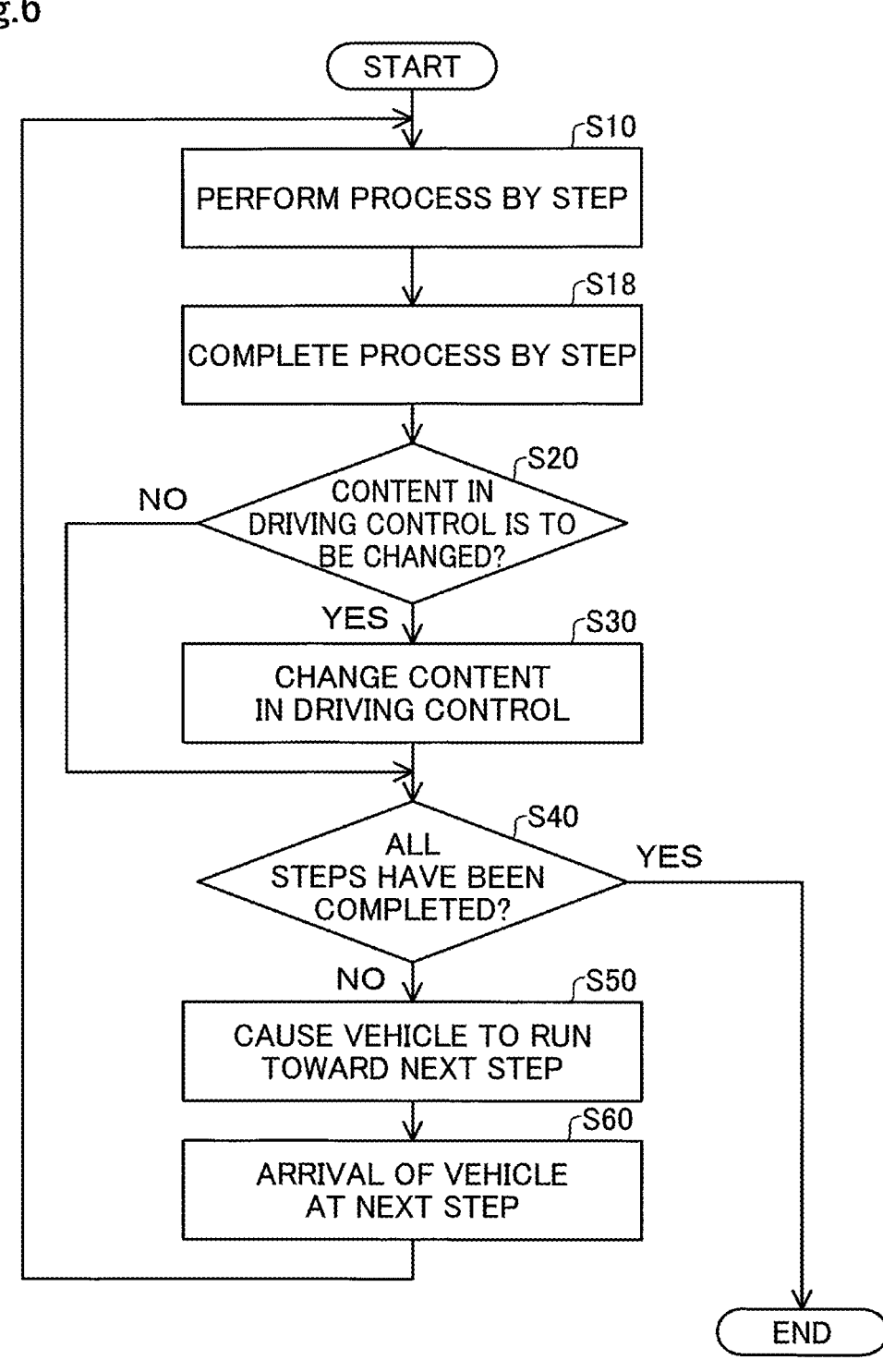
FIG. 6 is a flowchart showing a method of manufacturing the vehicle according to the first embodiment.

FIG. 6 is a flowchart showing a method of manufacturing the vehicle 100 according to the first embodiment. This flow is started in response to arrival of the vehicle 100 at a predetermine step, for example.

In step S10, a process by the step is performed on the vehicle 100. In step S18, the process by the step on the vehicle 100 is completed. The completion of the process is detected by the process completion detector 214 or the manufacturing information acquisition unit 314. In step S20, the control content change unit 216 judges whether a control content is to be added or changed as a result of the detected step. More specifically, the control content change unit 216 checks a control content to be changed or added associated with the detected step by referring to the control content change table 224. If control over the vehicle 100 is not to be changed or added (S20: NO), the processing is moved to step S40. If control over the vehicle 100 is to be changed or added (S20: YES), the control content change unit 216 moves the processing to step S30.

In step S30, the control content change unit 216 rewrites the control program 222 in response to the content in the control content change table 224. In step S40, the process completion detector 214 judges whether all steps during the course of manufacture of the vehicle 100 have been completed. If all the steps have been completed (S40: YES), this flow is finished. If all the steps have not been completed (S40: NO), the process completion detector 214 moves the processing to step S50. In step S50, the remote controller 312 starts running of the vehicle 100 and causes the vehicle 100 to run toward a next step. In this case, driving control over the vehicle 100 is performed on the basis of the rewritten control program 222. In step S60, the vehicle 100 arrives at the next step. When the vehicle 100 arrives at the next step, the processing is returned to step S10.

Figure 7:
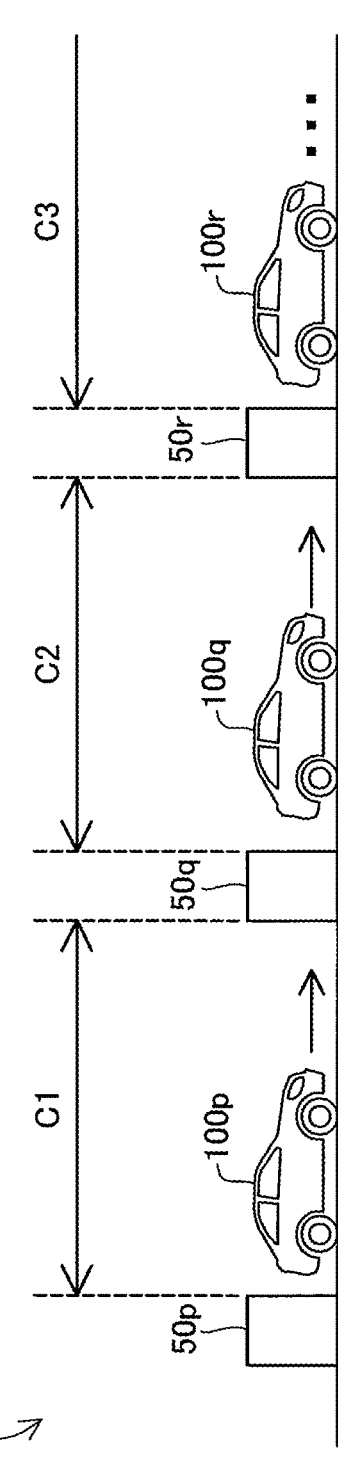
FIG. 7 is an explanatory view schematically showing the method of manufacturing the vehicle according to the first embodiment.

FIG. 7 is an explanatory view schematically showing the method of manufacturing the vehicle 100 according to the first embodiment. FIG. 7 schematically shows steps included in the pre-step 50, and vehicles 100p, 100q, and 100r automatically running in conveyance zones C1, C2, and C3 respectively between the steps. For example, the steps in FIG. 7 are a radar device mounting step 50p and a vehicle-mounted camera mounting step 50q belonging to the object detection device mounting step shown in FIG. 5, and a wheel speed sensor mounting step 50r belonging to the speed detection device mounting step shown in FIG. 5.

When a process by the radar device mounting step 50p is completed, the control content change unit 216 having referred to the control content change table 224 rewrites the control program 222 in such a manner as to implement automatic running of the vehicle 100 using a radar device. As a result, the vehicle 100p runs automatically in the conveyance zone C1 by driving control by the driving controller 212 of the vehicle 100$p$ instead of remote control by the remote controller 312 of the server 300.

When a process by the vehicle-mounted camera mounting step 50$q$ is completed, the control content change unit 216 having referred to the control content change table 224 further rewrites the control program 222 in such a manner as to implement automatic running using a vehicle-mounted camera. As a result, the vehicle 100$q$ runs automatically in the conveyance zone C2 by driving control by the driving controller 212 while implementing collision prevention control using the vehicle-mounted camera together with the radar device.

When a process by the wheel speed sensor mounting step 50$r$ is completed, the control content change unit 216 rewrites the control program 222 in such a manner as to implement automatic running employing acquisition of vehicle speed data using acquired wheel speed data and employing self location estimation using the wheel speed data. As a result, the vehicle 100$r$ runs automatically in the conveyance zone C3 by driving control by the driving controller 212 while implementing acquisition of vehicle speed data using wheel speed data and self location estimation using the wheel speed data.

As described above, the vehicle 100 of the present embodiment includes: the process completion detector 214 that detects completion of a process by at least one step included in a course of manufacture; and the control content change unit 216 that changes a content in control over the vehicle 100 if completion of the process is detected. This allows a content in the control over the vehicle 100 to be changed each time a process by a step is completed, making it possible to implement driving control over the vehicle 100 favorably for each step by remote control.

According to the vehicle 100 of the present embodiment, the process completion detector 214 detects completion of a process of adding an element to the vehicle 100 or a process of changing an element provided in the vehicle 100 performed by the step included in the course of manufacture. If completion of the process by the step is detected, the control content change unit 216 changes a content in the control over the vehicle 100 in such a manner as to implement the control using the element added to the vehicle 100 or the changed element in the vehicle 100. This makes it possible to appropriately use the element added to the vehicle 100 or the changed element in the vehicle 100 in response to a progress status of the course of manufacture of the vehicle 100, allowing the vehicle 100 to fulfill performance properly during automatic running. For example, by causing the vehicle 100 to fulfill performance properly during running such as increase in a running speed or expansion of a permissible range of a rudder angle of the vehicle 100, it becomes possible to improve production efficiency of the vehicle 100.

According to the vehicle 100 of the present embodiment, the course of manufacture of the vehicle 100 includes an object detection device mounting step where a process of mounting an object detection device is performed. The object detection device includes at least one of a radar device and a vehicle-mounted camera. The object detection device is capable of detecting an object around the vehicle 100. If completion of the object detection device mounting step is detected, the control content change unit 216 changes a content in the control over the vehicle 100 in such a manner as to implement collision prevention control using the mounted object detection device. Thus, along with the completion of the object detection device mounting step, it is possible to prevent collision during automatic running of the vehicle 100.

According to the vehicle 100 of the present embodiment, the control content change unit 216 further changes a content in the control over the vehicle 100 in such a manner as to cause the vehicle 100 to run by driving control by the vehicle 100 using the collision prevention control instead of driving control by remote control. Thus, along with the completion of the object detection device mounting step, it is possible to switch a subject to implement control over the vehicle 100 from remote control by the server 300 to automatic running by driving control by the vehicle 100.

According to the vehicle 100 of the present embodiment, the course of manufacture of the vehicle 100 includes a speed detection device mounting step where a process of mounting a speed detection device is performed. The speed detection device includes at least one of a vehicle speed sensor, a wheel speed sensor, an acceleration sensor, and a yaw rate sensor. The speed detection device is capable of acquiring speed information about a speed of the vehicle 100. If completion of the speed detection device mounting step is detected, the control content change unit 216 changes a content in the control over the vehicle 100 in such a manner as to implement driving control using the speed information detected by the mounted speed detection device. Thus, along with the completion of the speed detection device mounting step, it is possible to make self location estimation or implement feedback control over a vehicle speed using the detected speed information.

According to the vehicle 100 of the present embodiment, the course of manufacture of the vehicle 100 includes an adjusting step including at least one of a wheel alignment adjusting step where a process of adjusting a wheel alignment is performed and a suspension adjusting step where a process of adjusting a suspension is performed. If completion of the adjusting step is detected, the control content change unit 216 changes a content in the control over the vehicle 100 in such a manner as to increase an upper limit of a running speed of the vehicle 100. Thus, along with the completion of the adjusting step, it is possible to increase a running speed of the vehicle 100, thereby achieving improvement of the productivity of the vehicle 100.

B. Second Embodiment

Figure 8:
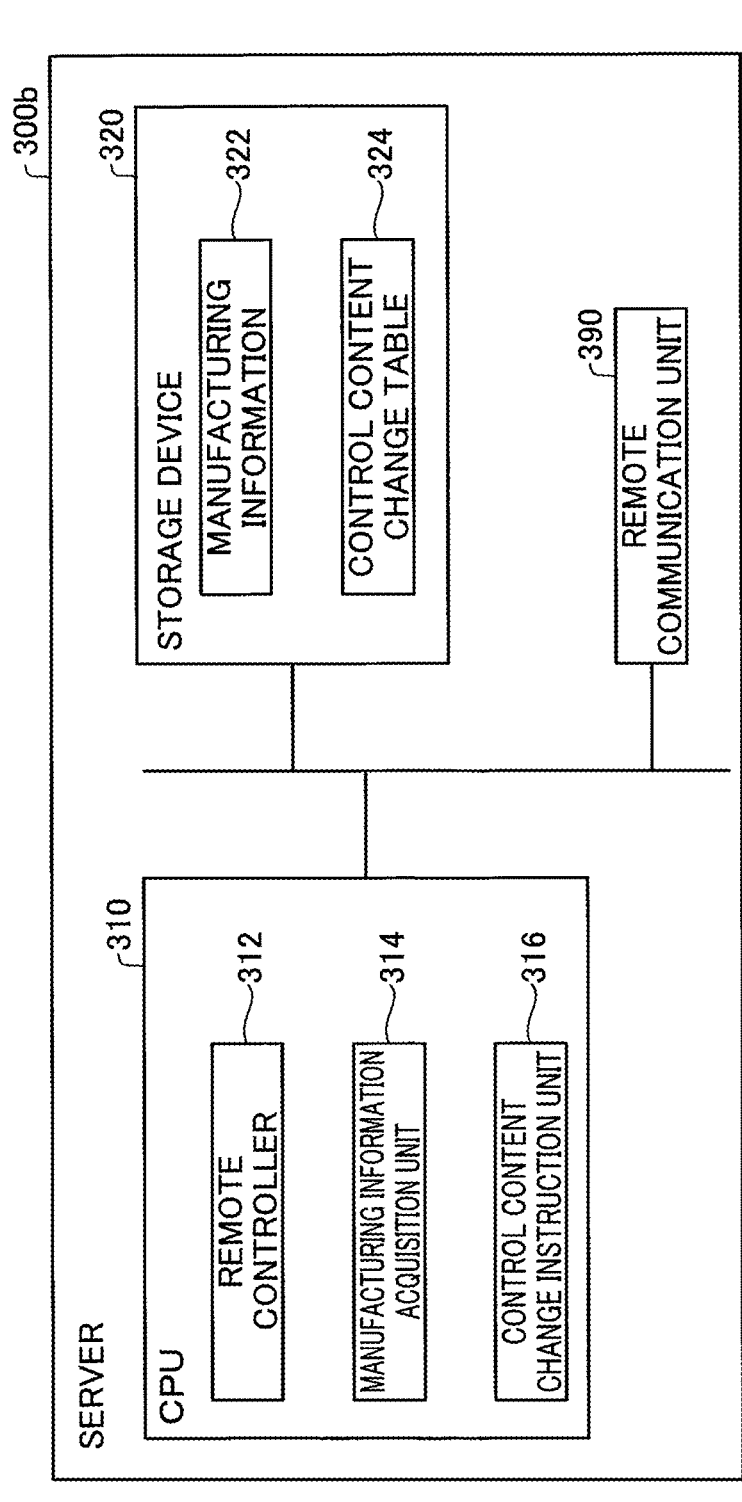
FIG. 8 is a block diagram showing an internal functional configuration of a server according to a second embodiment.
Figure 9:
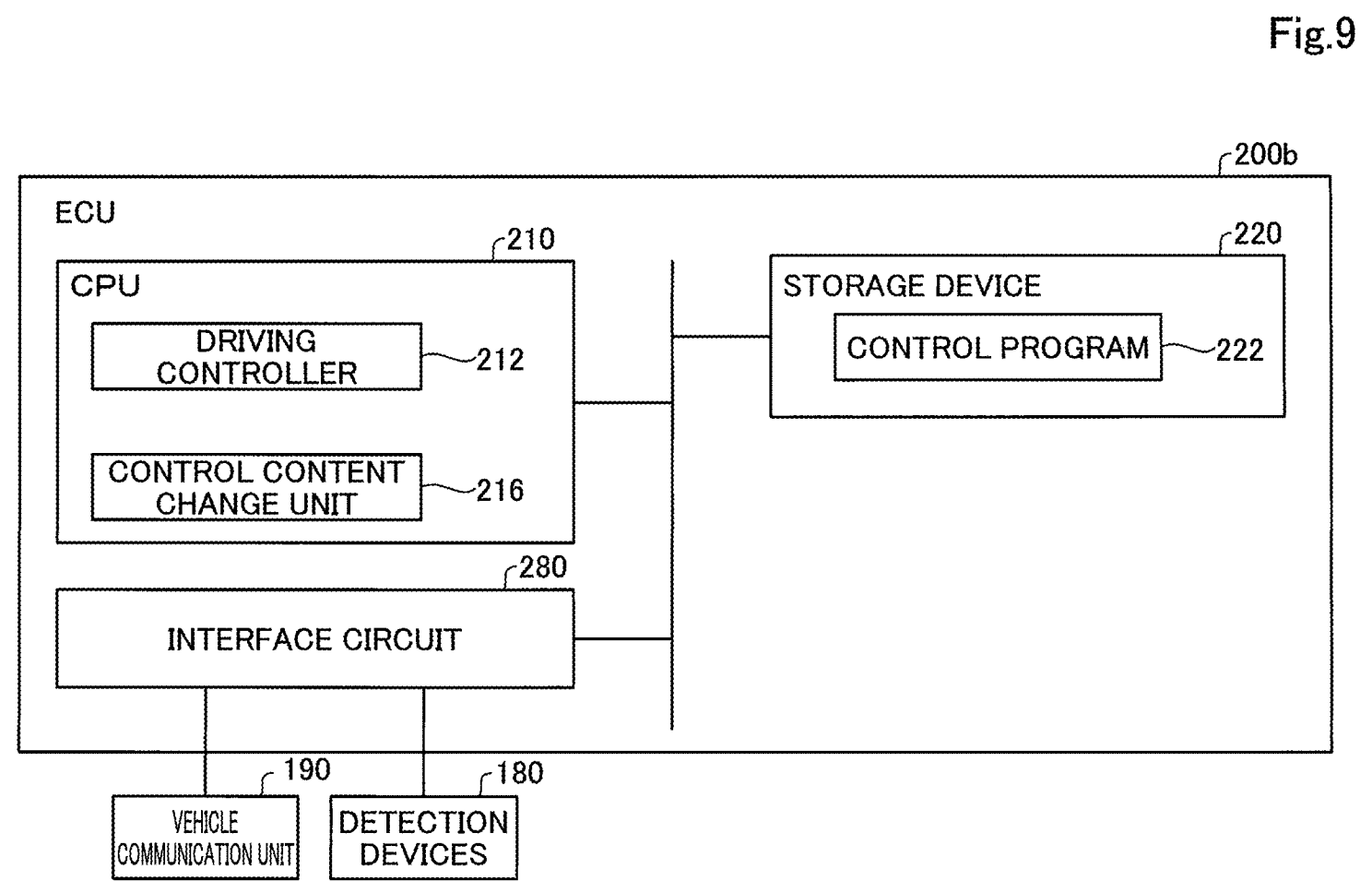

FIG. 8 is a block diagram showing an internal functional configuration of a server 300$b$ according to a second embodiment. FIG. 9 is a block diagram showing an internal functional configuration of an ECU 200$b$ provided at the vehicle 100 according to the second embodiment. As shown in FIGS. 8 and 9, the present embodiment differs from the first embodiment in that the storage device 220 of the ECU 200$b$ does not store the control content change table 224 but the storage device 320 of the server 300$b$ stores a control content change table 324. The configuration of the control content change table 324 is the same as that of the control content change table 224 described in the first embodiment.

The present embodiment differs from the first embodiment in that the CPU 210 of the ECU 200$b$ does not function as the process completion detector 214 but the CPU 310 of the server 300$b$ functions as a control content change instruction unit 316. If the manufacturing information acquisition unit 314 detects completion of a process by each step, the control content change instruction unit 316 instructs the control content change unit 216 of the vehicle 100 to add or change a content in control over the vehicle 100 in such a manner as to use an element added to the vehicle 100 or an element in the vehicle 100 changed as a result of completion of the process. In the present embodiment, the control content change instruction unit 316 instructs the control content change unit 216 by referring to the control content change table 324 to rewrite the control program 222 to a program in which the control content associated with the completed step is added or changed. As a result, the control content of the control program 222 is changed to a control content using the element added to the vehicle 100 or the element in the vehicle 100 changed as a result of the completed process.

As described above, the server 300b of the present embodiment includes: the manufacturing information acquisition unit 314 that acquires the manufacturing information 322 containing a progress status of a process of adding an element to the vehicle 100 or a process of changing an element provided in the vehicle 100 performed by a step included in the course of manufacture; and the control content change instruction unit 316. If the completion of the process is detected, the control content change instruction unit 316 instructs the vehicle 100 to change a content in control over the vehicle 100 in such a manner as to use the element added to the vehicle 100 or the element in the vehicle 100 changed as a result of the completion of the process. This makes it possible to appropriately use the element added to the vehicle 100 or the changed element in the vehicle 100 in response to a progress status of the course of manufacture of each vehicle 100 managed by the server 300b, allowing each vehicle 100 to fulfill performance properly during automatic running.

C. Third Embodiment

Figure 10:
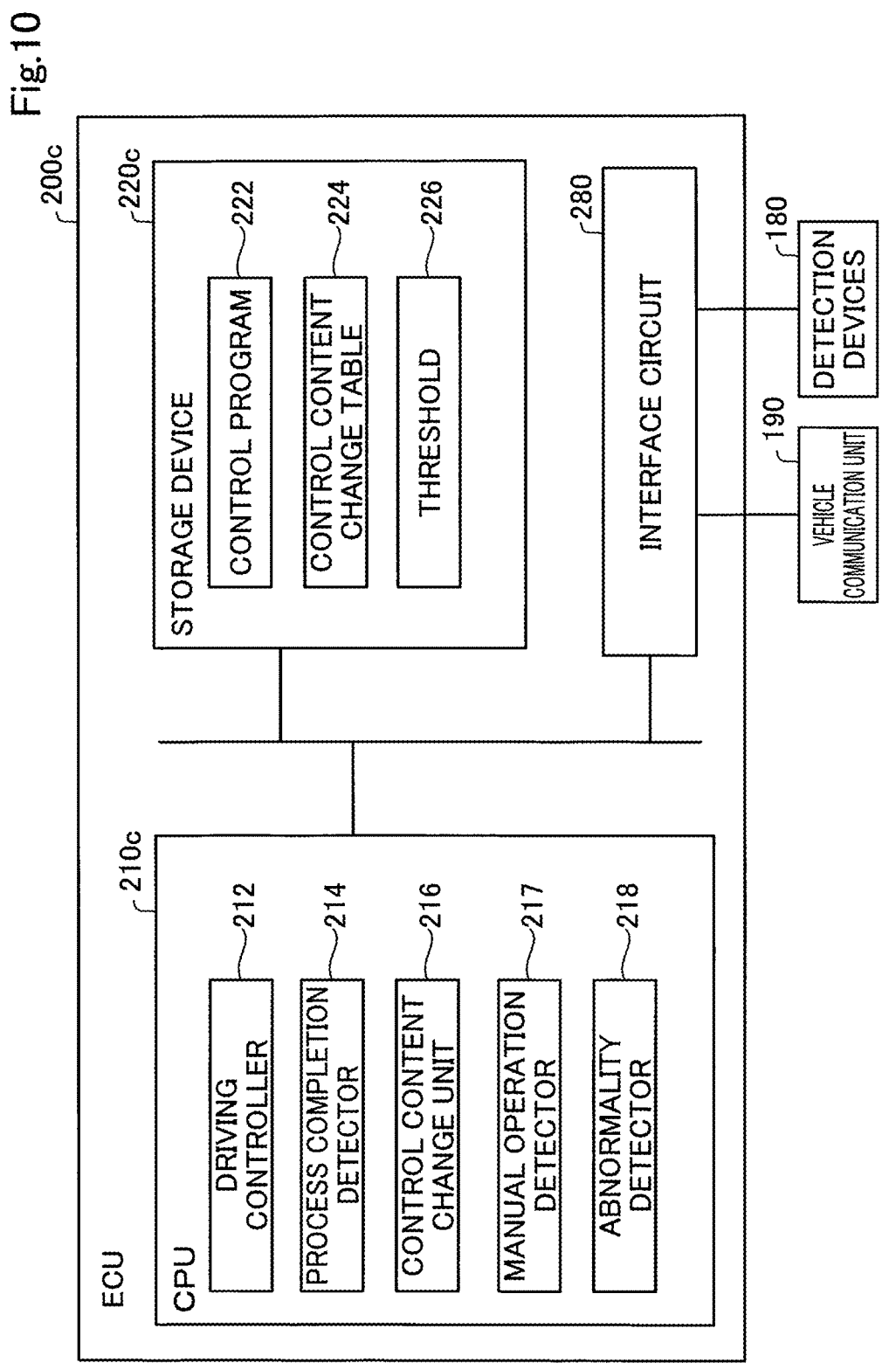
FIG. 10 is a block diagram showing an internal functional configuration of an ECU of a vehicle according to a third embodiment.

FIG. 10 is a block diagram showing an internal functional configuration of an ECU 200c provided at the vehicle 100 according to a third embodiment. As shown in FIG. 10, in the present embodiment, the vehicle 100 is provided with the ECU 200c including a CPU 210c and a storage device 220c. The CPU 210c differs from the CPU 210 described in the first embodiment in that the CPU 210c further includes a manual operation detector 217 and an abnormality detector 218. The configuration of the CPU 210c is otherwise the same as that of the CPU 210. The storage device 220c differs from the storage device 220 described in the first embodiment in that it further stores a threshold 226. The configuration of the storage device 220c is otherwise the same as that of the storage device 220.

Figure 11:
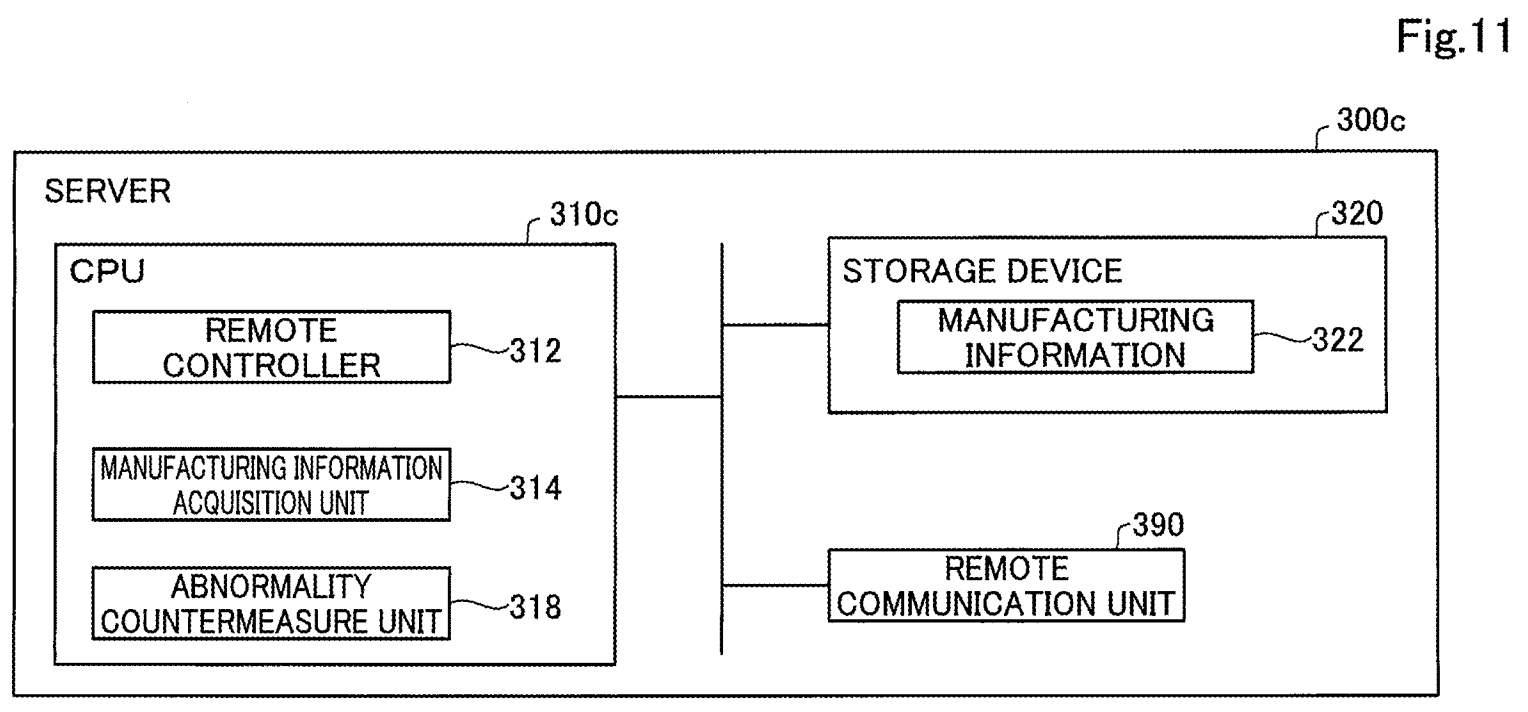

FIG. 11 is a block diagram showing an internal functional configuration of a server 300c according to the third embodiment. As shown in FIG. 11, the server 300c differs from the server 300 of the first embodiment in that it includes a CPU 310c further including an abnormality countermeasure unit 318 instead of the CPU 310. The configuration of the server 300c is otherwise the same as that of the server 300.

The manual operation detector 217 includes sensors for detecting the amount of manual operation on the operation unit 170. The "amount of operation on the operation unit 170" includes accelerator position, a rudder angle, or the amount of depression of a foot brake, for example. The amount of operation on the operation unit 170 to be used may be an output value regarding driving control based on manual operation on the operation unit 170 such as a speed, an acceleration, a deceleration, an actual rudder angle, or braking force of the vehicle 100, for example.

The abnormality detector 218 detects unscheduled operation on the operation unit 170 as abnormality. More specifically, if the amount of manual operation on the operation unit 170 exceeds the threshold 226 relaxed by the control content change unit 216 as described later, the abnormality detector 218 detects the presence of unscheduled operation on the operation unit 170. Result of the detection by the abnormality detector 218 is output to the server 300c.

The threshold 226 is used for judging whether to implement so-called override. In the present specification, the "override" means a process for implementing manual driving control over the vehicle 100 using the operation unit 170 in preference to driving control over the vehicle 100 by unmanned driving if the driving control over the vehicle 100 by unmanned driving and the driving control over the vehicle 100 using the operation unit 170 are implemented simultaneously.

The threshold 226 is set in advance using the amount of operation on the operation unit 170. In the present embodiment, while the expected amount of operation on the operation unit 170 for remote control is defined as a reference value, the threshold 226 covers a lower limit smaller than the reference value by a predetermined operation amount and an upper limit larger than the reference value by a predetermined operation amount. If the detected amount of operation on the operation unit 170 is less than the lower limit or larger than the upper limit, driving control through operation on the operation unit 170 is implemented preferentially by the override. For example, if the handle of the vehicle 100 is operated by remote control and at the same time, the handle is operated manually to an amount larger than an upper limit of a handle operation amount or smaller than a lower limit of the handle operation amount, driving control through the manual handle operation is implemented preferentially by the override. If the amount of operation on the operation unit 170 is equal to or greater than the lower limit and equal to or less than the upper limit, driving control by remote control is implemented in preference to driving control by manual operation. The threshold 226 is set individually for each type of the operation unit 170 such as a handle, an accelerator, or a brake, for example. The threshold 226 may be included in the control content change table 224.

During a course of manufacture of the vehicle 100, self-running conveyance of the vehicle 100 by remote control may be conducted in an driverless state. The driverless state means no driver in the vehicle 100. Generally, in the driverless state, the operation unit 170 is not manually operated so the override does not occur. However, even during self-running conveyance of the vehicle 100, boarding of a worker or the like on the vehicle 100 is still likely to occur for a purpose such as inspection inside the vehicle 100 or mounting of a part into the vehicle 100, for example. In this case, if the worker or the like touches the operation unit 170 erroneously, for example, the amount of operation on the operation unit 170 may exceed the threshold 226. This results in a likelihood that the self-running conveyance of the vehicle 100 will be stopped unintentionally by the override.

In the present embodiment, in a step where a worker possibly touches the operation unit 170 during self-running conveyance, the threshold 226 is relaxed to a value that imposes difficulty in giving preference to driving control using the operation unit 170, namely, a value that imposes difficulty in the implementation of the override. This reduces or prevents the implementation of the override to be implemented unintentionally by a worker or the like during self-running conveyance. In view of this, the relaxed threshold 226 may also be called a threshold for detecting unscheduled operation on the operation unit 170. Association between a step where a worker possibly touches the operation unit 170 during self-running conveyance and the relaxed threshold 226 is defined in advance in the control content change table 224. The relaxed threshold 226 is set in advance using a value favorable for each type of the operation unit 170.

If the abnormality detector 218 detects unscheduled operation on the operation unit 170, the abnormality countermeasure unit 318 takes an abnormality countermeasure defined in advance. The abnormality countermeasure includes notification of the occurrence of abnormality to an administrator or a worker involved in a step where abnormality has occurred or stop of manufacture of the vehicle 100 through emergency stop of a manufacturing facility or a manufacturing line, for example.

Figure 12:
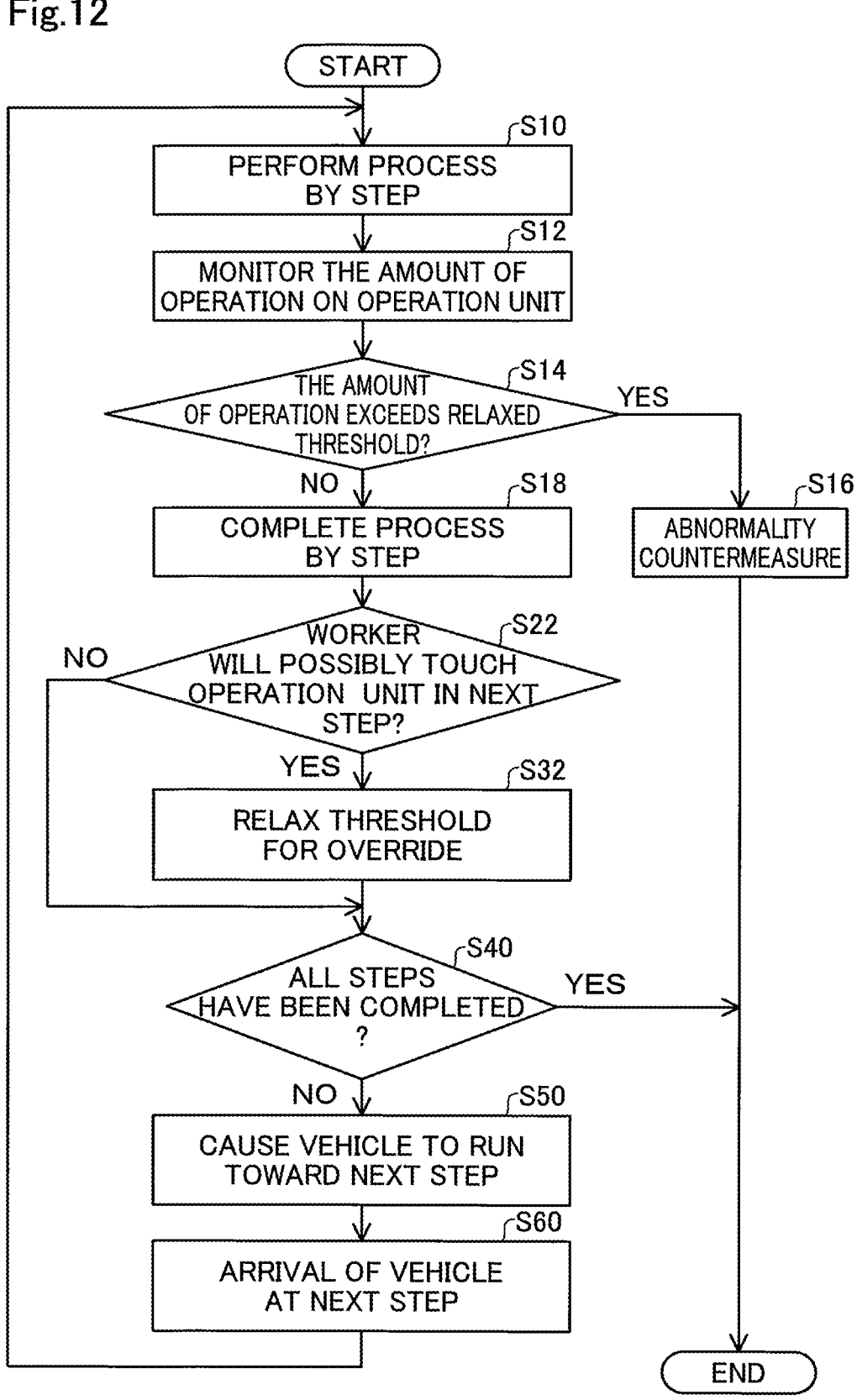
FIG. 12 is a flowchart showing a method of manufacturing the vehicle according to the third embodiment.

FIG. 12 is a flowchart showing a method of manufacturing the vehicle 100 according to the third embodiment. The flow in FIG. 12 differs from the flow of the method of manufacturing the vehicle 100 according to the first embodiment shown in FIG. 6 in that the flow in FIG. 12 includes steps S12, S14, and S16 after step S10 and that the flow in FIG. 12 includes steps S22 and S32 instead of steps S20 and S30.

In step S12, the manual operation detector 217 monitors the amount of operation on the operation unit 170. In step S14, the manual operation detector 217 judges whether the amount of operation on the operation unit 170 exceeds the relaxed threshold 226. If the amount of operation on the operation unit 170 is within the relaxed threshold 226 (S14: NO), the processing is moved to step S18. If the threshold 226 is not relaxed at the time of implementation of step S12, the processing may be moved to step S18 by skipping steps S12, S14, and S16.

If it is judged in step S14 that the amount of operation on the operation unit 170 exceeds the relaxed threshold 226 (S14: YES), the manual operation detector 217 moves the processing to step S16. In step S16, the abnormality countermeasure unit 318 takes an abnormality countermeasure. More specifically, the abnormality detector 218 outputs detection result about the unscheduled operation on the operation unit 170 to the server 300c. In response to acquisition of the detection result from the abnormality detector 218 of the vehicle 100, the abnormality countermeasure unit 318 of the server 300c takes the abnormality countermeasure to finish this flow. More specifically, the abnormality countermeasure unit 318 stops manufacture of the vehicle 100 by notifying the occurrence of abnormality to an administrator or a worker involved in a step where the abnormality has occurred and stopping a manufacturing line emergently.

In step S22, the control content change unit 216 judges whether a worker will possibly touch the operation unit 170 in a next step. More specifically, the control content change unit 216 refers to the control content change table 224 to judge whether the next step is a step where the worker will possibly touch the operation unit 170. If the next step is a step with no possibility of touch with the operation unit 170 (S22: NO), the control content change unit 216 moves the processing to step S40. Steps S22 and S32 may be performed after it is judged in step S40 that all steps have not been completed and before implementation of step S50.

If the worker will possibly touch the operation unit 170 in the next step (S22: YES), the control content change unit 216 relaxes the threshold 226. More specifically, the control content change unit 216 changes the threshold 226 to a relaxed value according to the control content change table 224.

As described above, according to the vehicle 100 of the present embodiment, the storage device 220c of the ECU 200c further stores the threshold 226. The threshold 226 is used for judging whether to give preference to the driving control using the operation unit 170 over the driving control by remote control If driving control by remote control and driving control using the operation unit 170 are implemented simultaneously. The process completion detector 214 detects completion of a process by a step prior to a step where a worker will possibly touch the operation unit 170. If the process completion detector 214 detects completion of the process by the prior step, the control content change unit 216 changes a content in control over the vehicle 100 in such a manner as to relax the threshold 226 to a value that imposes difficulty in giving preference to the driving control using the operation unit 170. By doing so, it becomes possible to reduce or prevent trouble of unintentionally stopping self-running conveyance of the vehicle 100 by remote control due to erroneous touch with the operation unit 170 by a worker or the like during the self-running conveyance of the vehicle 100.

D. Fourth Embodiment

Figure 13:
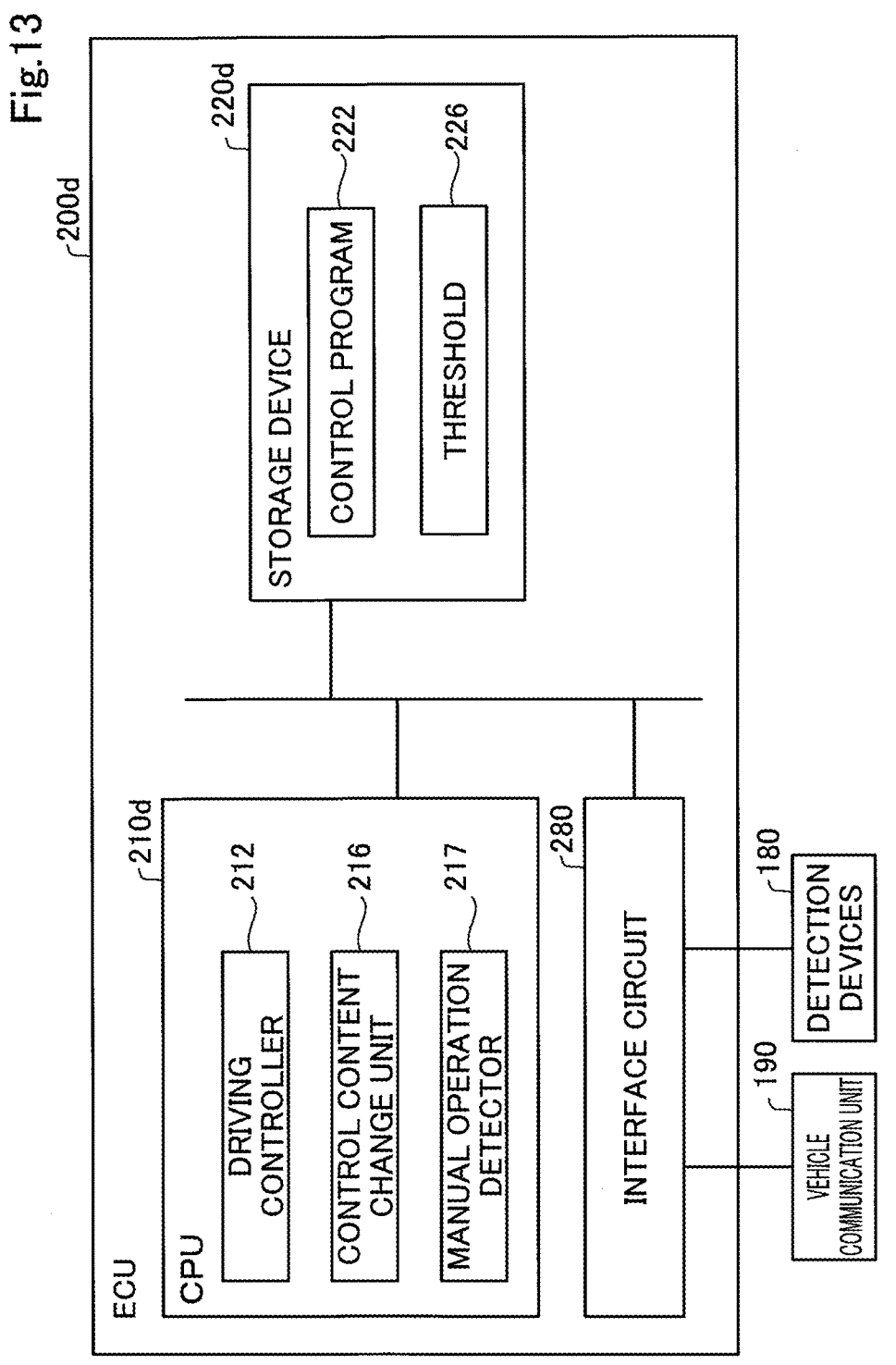
FIG. 13 is a block diagram showing an internal functional configuration of an ECU of a vehicle according to a fourth embodiment.
Figure 14:
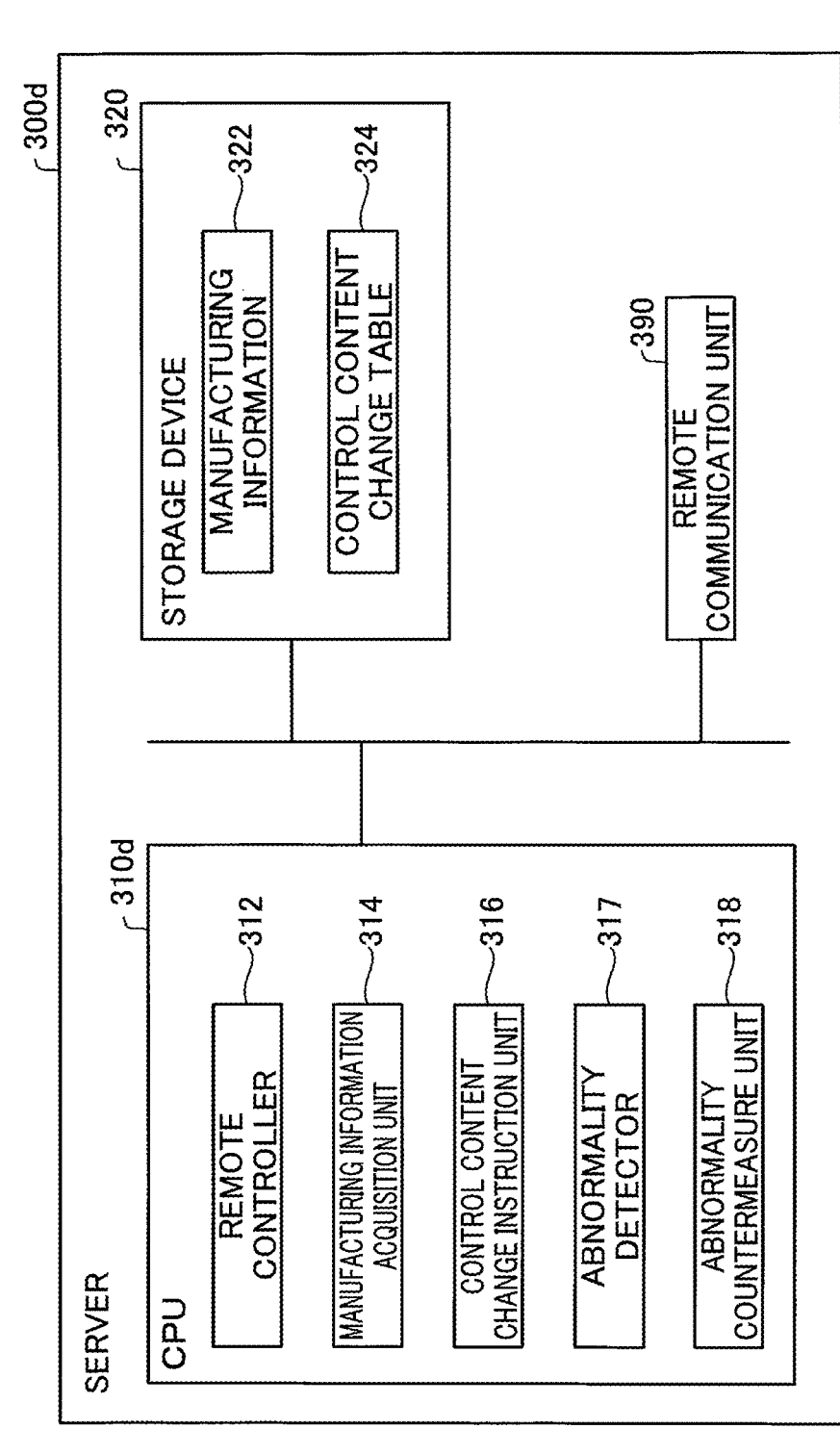
FIG. 14 is a block diagram showing an internal functional configuration of a server according to the fourth embodiment.

FIG. 13 is a block diagram showing an internal functional configuration of an ECU 200d provided at the vehicle 100 according to a fourth embodiment. FIG. 14 is a block diagram showing an internal functional configuration of a server 300d according to the fourth embodiment. As shown in FIGS. 13 and 14, the present embodiment differs from the configurations of the ECU 200c and the server 300c described in the third embodiment in that a storage device 220d of the ECU 200d does not store the control content change table 224 but the storage device 320 of the server 300d stores the control content change table 324. The configuration of the control content change table 324 is the same as that of the control content change table 224 described in the third embodiment.

A CPU 210d of the ECU 200d has a configuration differing from that of the CPU 210c of the ECU 200c described in the third embodiment in that it does not function as the process completion detector 214 and the abnormality detector 218. A CPU 310d of the server 300d has a configuration differing from that of the server 300c of the third embodiment in that it further functions as the control content change instruction unit 316 and an abnormality detector 317.

In the present embodiment, the manufacturing information acquisition unit 314 acquires manufacturing information, and acquires completion of a process by a step prior to a next step that is a step where a worker will possibly touch the operation unit 170 by referring to the acquired manufacturing information. Result of the acquisition by the manufacturing information acquisition unit 314 is output to the control content change instruction unit 316.

The control content change instruction unit 316 may judge whether the next step is a step where the worker will possibly touch the operation unit 170 by referring to the control content change table 324 and using the manufacturing information acquired by the manufacturing information acquisition unit 314. If the next step is a step where the worker will possibly touch the operation unit 170, the control content change instruction unit 316 instructs the control content change unit 216 to change the threshold 226 to a relaxed value according to the control content change table 324. As a result, the threshold 226 stored in the storage device 220d of the ECU 200d is changed to the relaxed value.

The abnormality detector 317 sequentially acquires the amount of operation on the operation unit 170 acquired by the manual operation detector 217. Like the abnormality detector 218 described in the third embodiment, the abnormality detector 317 detects the presence of unscheduled operation on the operation unit 170 if the acquired amount of operation on the operation unit 170 exceeds the relaxed threshold 226. Result of the detection by the abnormality detector 317 is output to the abnormality countermeasure unit 318. Like the abnormality countermeasure unit 318 described in the third embodiment, the abnormality countermeasure unit 318 takes an abnormality countermeasure defined in advance in response to detection of the unscheduled operation on the operation unit 170.

As described above, according to the server 300d of the present embodiment, the manufacturing information acquisition unit 314 acquires completion of a process by a step prior to a predetermined step as a step where a worker will possibly touch the operation unit 170. If completion of the process by the prior step is acquired, the control content change instruction unit 316 instructs the vehicle 100 to change a content in control over the vehicle 100 in such a manner as to relax the threshold 226 to a value that imposes difficulty in giving preference to driving control using the operation unit 170. By doing so, in the present embodiment, it becomes possible to reduce or prevent trouble of unintentionally stopping self-running conveyance of the vehicle 100 by remote control due to erroneous touch with the operation unit 170 by a worker or the like during the self-running conveyance of the vehicle 100, like in the third embodiment.

According to the server 300d of the present embodiment, if driving control using the operation unit 170 is implemented preferentially after the control content change unit 216 relaxes the threshold 226, an abnormality countermeasure including stop of manufacture of the vehicle 100 and notification is taken. Taking the abnormality countermeasure instead of the override makes it possible to reduce or prevent risk to be caused by relaxing the threshold 226.

E. Fifth Embodiment

Figure 15:
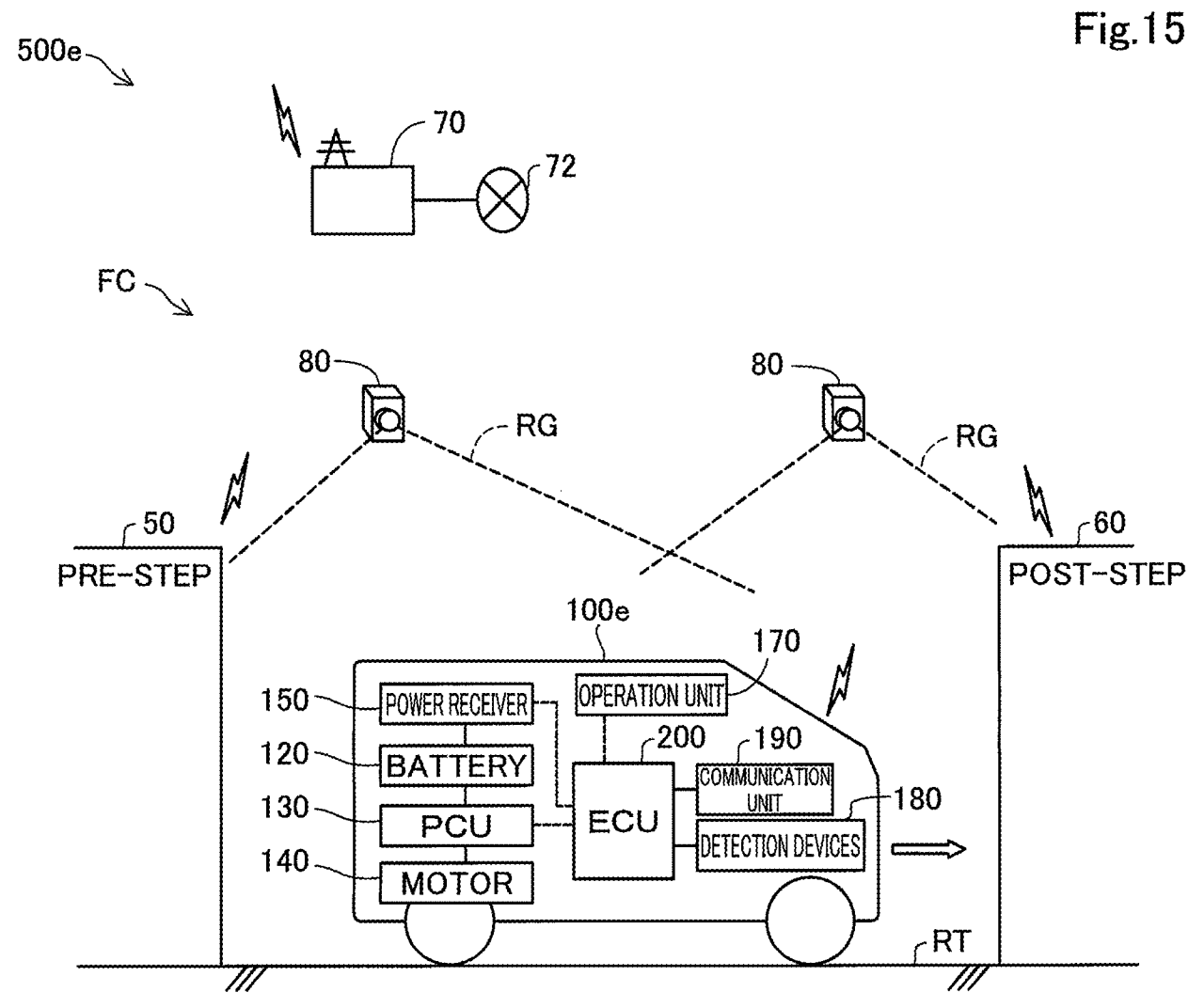

FIG. 15 is an explanatory view showing a schematic configuration of a system 500e according to a fifth embodiment. In the present embodiment, the system 500e differs from the first embodiment in that the system 500e does not include the server 300. The configuration of the system 500e is otherwise the same as that of the first embodiment.

Figure 16:
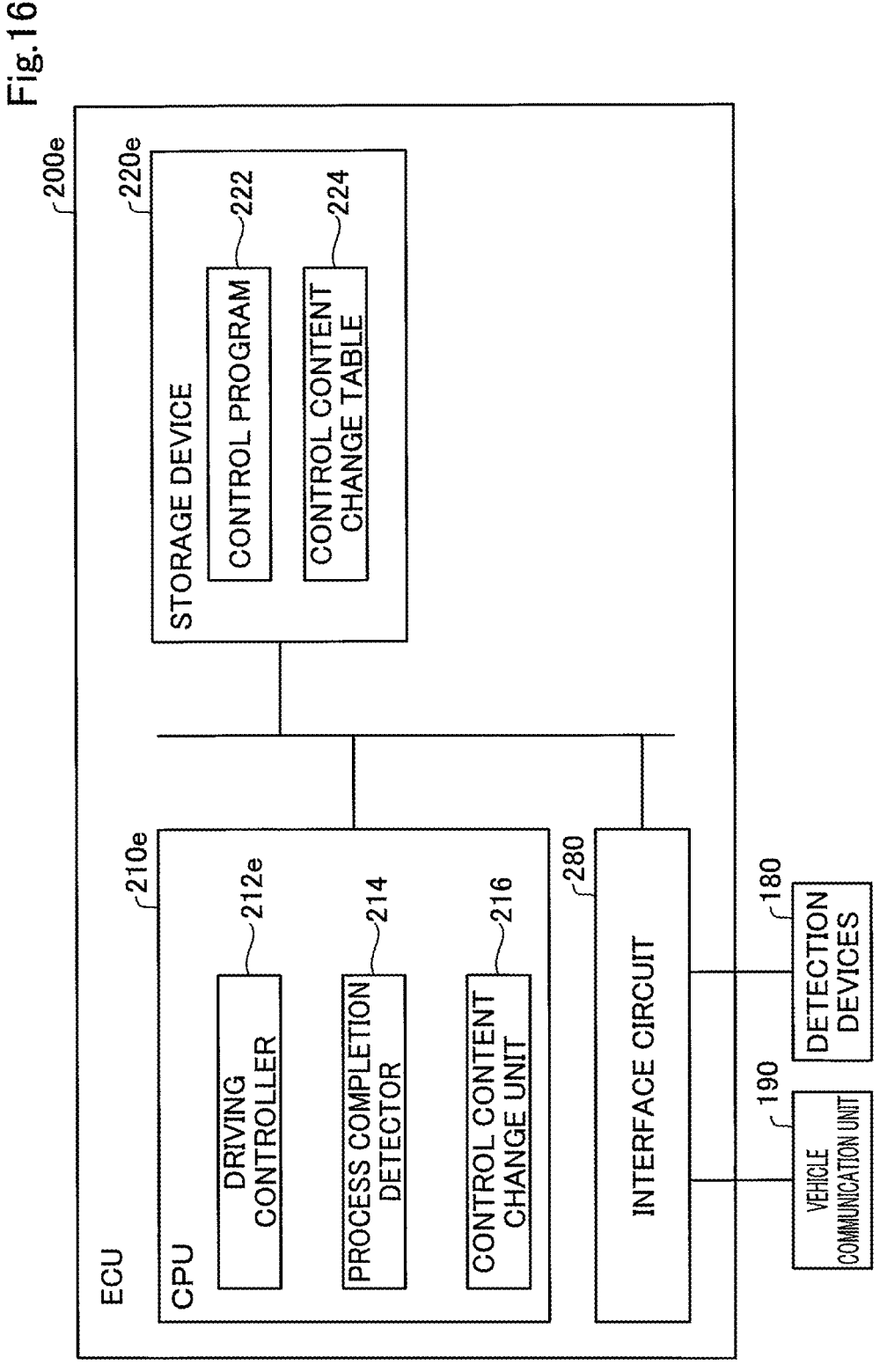
FIG. 16 is an explanatory view showing an internal functional configuration of an ECU of a vehicle according to the fifth embodiment.

FIG. 16 is an explanatory view showing an internal functional configuration of an ECU 200e of a vehicle 100e according to the fifth embodiment. As shown in FIG. 16, the ECU 200e includes a CPU 210e as a central processing unit, a storage device 220e such as a ROM or a RAM, and the vehicle communication unit 190 connected to an interface circuit not shown in the drawings. These units are connected to each other via an internal bus in a manner allowing bidirectional communication therebetween. In the present embodiment, the CPU 210e executes various computer programs stored in the storage device 220e to realize various types of functions including a driving controller 212e, the process completion detector 214, and the control content change unit 216. As will be described later, the driving controller 212e of the present embodiment allows the vehicle 100e to run by autonomous control by the vehicle 100e. More specifically, the driving controller 212e allows the vehicle 100e to run by autonomous control by acquiring detection result obtained by a sensor, generating a running control signal using the detection result, and outputting the generated running control signal to actuate each actuator of the vehicle 100e.

Figure 17:
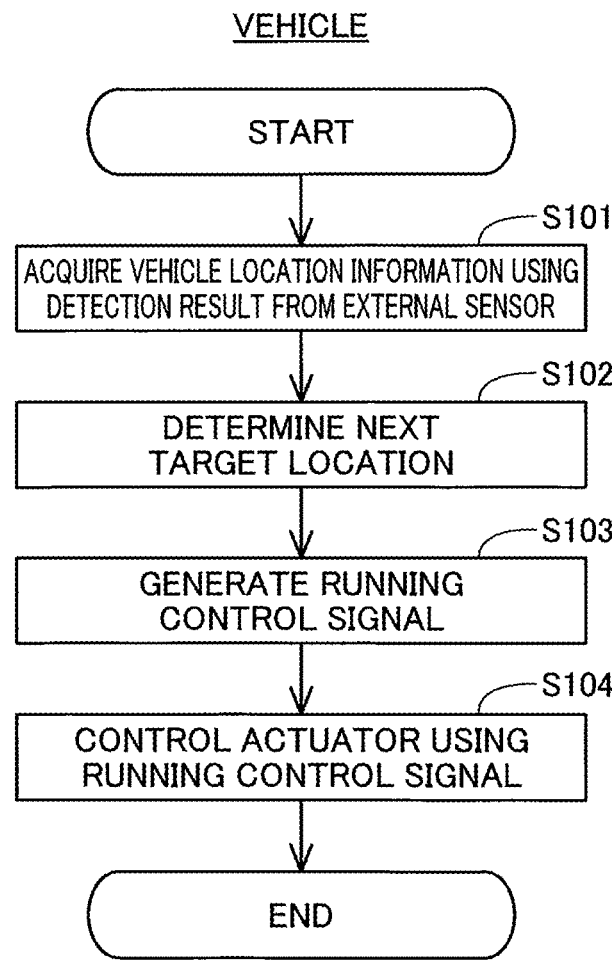
FIG. 17 is a flowchart showing a processing procedure of running control over the vehicle according to the fifth embodiment.

FIG. 17 is a flowchart showing a processing procedure for running control of the vehicle 100e in the fifth embodiment. Since the configuration of the vehicle in the present embodiment is the same as in the first embodiment, the vehicle in the present embodiment is denoted as vehicle 100e for convenience. In step S101, the vehicle 100e acquires vehicle location information using detection result output from the camera as an external sensor. In step S102, the vehicle 100e determines a target location to which the vehicle 100e is to move next. In step S103, the vehicle 100e generates a running control signal for causing the vehicle 100e to run to the determined target location. In step S104, the vehicle 100e controls an actuator using the generated running control signal, thereby causing the vehicle 100e to run by following a parameter indicated by the running control signal. The vehicle 100e repeats the acquisition of vehicle location information, the determination of a target location, the generation of a running control signal, and the control over the actuator in a predetermined cycle. According to the running control in the present embodiment, it is possible to cause the vehicle 100e to run by autonomous control without controlling the vehicle 100e remotely using the server 300.

In the present embodiment, a manufacturing method substantially the same as the manufacturing method in FIG. 6 is implemented. In the present embodiment, completion of a process by step S18 is detected by the process completion detector 214. The process completion detector 214 may acquire completion of a process by each step on its own vehicle from a sensor, a camera, or the like provided at this step or may acquire the completion using manufacturing information. The process completion detector 214 may acquire the manufacturing information from a step management device provided at each of steps or from a production management device that collectively manages manufacturing statuses in each step. In step S50 of the present embodiment, the driving controller 212e of the vehicle 100e starts running of the vehicle 100e and causes the vehicle 100e to run toward a next step. In this case, driving control over the vehicle 100e is implanted on the basis of the rewritten control program 222.

As described above, the system 500e of the present embodiment allows a content in control over the vehicle 100e to be changed each time a process by a step is completed, making it possible to implement driving control over the vehicle 100e favorably for each step by autonomous control.

Like in the present embodiment, in other embodiments where the vehicle 100e runs by autonomous control, the CPU 210e may include the manual operation detector 217, the abnormality detector 218, and the abnormality countermeasure unit 318, the storage device 220e may store the threshold 226, and the manufacturing method shown in FIG. 12 may be implemented. In this case, step S16 is performed by the abnormality countermeasure unit 318 of the vehicle 100e in a way substantially the same as that in the third embodiment. More specifically, the abnormality detector 218 outputs detection result about unscheduled operation on the operation unit 170, and the abnormality countermeasure unit 318 acquires the detection result and takes an abnormality countermeasure. By doing so, it becomes possible to reduce or prevent trouble of unintentionally stopping self-running conveyance of the vehicle 100e by autonomous control due to erroneous touch with the operation unit 170 by a worker or the like during the self-running conveyance of the vehicle 100*e*.

In other embodiments where the vehicle 100*e* runs by autonomous control, the system 500 may be provided with the server 300, for example. In this case, like in each of the above-described embodiments, the CPU 310 of the server 300 may function as the manufacturing information acquisition unit 314, the control content change instruction unit 316, or the abnormality countermeasure unit 318, for example. In this case, like in each of the above-described embodiments, the storage device 320 of the server 300 may store the manufacturing information 322 or the control content change table 324, for example.

F. Other Embodiments (F1) In the example shown in the above-described second embodiment, the control content change instruction unit 316 is provided at the server 300*b* and the control content change unit 216 is provided at the ECU 200*b* of the vehicle 100. Meanwhile, the server 300*b* may include a control content change unit instead of the control content change instruction unit 316. This configuration allows the server 300*b* to change a content in control over the vehicle 100 directly. In this case, the control content change unit 216 of the ECU 200*b* becomes omissible, making it possible to reduce processing burden on the ECU 200*b*.

(F2) In each of the above-described embodiments, the vehicle 100 is simply required to have a configuration to become movable by unmanned driving. The vehicle 100 may embodied as a platform having the following configuration, for example. The vehicle 100 is simply required to include at least actuators and a controller. More specifically, in order to fulfill three functions including "run," "turn," and "stop" by unmanned driving, the actuators may include a driving device, a steering device and a braking device. The actuators are controlled by the controller that controls running of the vehicle 100. In order for the vehicle 100 to acquire information from outside for unmanned driving, the vehicle 100 is simply required to include the communication device further. Specifically, the vehicle 100 to become movable by unmanned driving is not required to be equipped with at least some of interior components such as a driver's seat and a dashboard, is not required to be equipped with at least some of exterior components such as a bumper and a fender or is not required to be equipped with a bodyshell. In such cases, a remaining component such as a bodyshell may be mounted on the vehicle 100 before the vehicle 100 is shipped from a factory, or a remaining component such as a bodyshell may be mounted on the vehicle 100 after the vehicle 100 is shipped from a factory while the remaining component such as a bodyshell is not mounted on the vehicle 100. Each of components may be mounted on the vehicle 100 from any direction such as from above, from below, from the front, from the back, from the right, or from the left. Alternatively, these components may be mounted from the same direction or from respective different directions. The location determination for the platform may be performed in the same way as for the vehicle 100 in the first embodiments.

(F3) In the example shown in the above-described third embodiment, the threshold 226 covers a lower limit smaller than a reference value of the amount of operation on the operation unit 170 scheduled for remote control by a predetermined operation amount, and an upper limit larger than the reference value by a predetermined operation amount. Meanwhile, the threshold 226 may be set using only one of the upper limit and the lower limit. The threshold 226 may be set using a difference between the amount of operation on the operation unit 170 by unmanned driving and the amount of manual operation on the operation unit 170, for example. The threshold 226 may be set using an absolute value of the amount of manual operation on the operation unit 170. The threshold 226 may be set using a total value of the amount of operation on the operation unit 170 by unmanned driving and the amount of operation on the operation unit 170 added by manual operation.

(F4) In the example shown in the above-described third embodiment, the threshold 226 is relaxed to a value that imposes difficulty in the implementation of the override. Meanwhile, relaxing of the threshold 226 may include turning off the function of the override.

(F5) In the example shown in the above-described third embodiment, if the amount of operation on the operation unit 170 exceeds the relaxed threshold 226 in step S14, the abnormality countermeasure unit 318 takes an abnormality countermeasure in step S16. Meanwhile, in step S16, instead of or together with taking an abnormality countermeasure, the override may be performed to implement driving control over the vehicle 100 using the operation unit 170 in preference to driving control over the vehicle 100 by remote control. This configuration makes it possible to reduce the occurrence of stop of self-running conveyance of the vehicle 100 due to erroneous operation on the operation unit 170 and to perform manual operation on the operation unit 170 by the override.

(F6) In each of the above-described embodiments, the external sensor is not limited to the camera 80 but may be the distance measuring device, for example. The distance measuring device is a light detection and ranging (LiDAR) device, for example. In this case, detection result output from the external sensor may be three-dimensional point cloud data representing the vehicle 100. The server 300 and the vehicle 100 may acquire the vehicle location information through template matching using the three-dimensional point cloud data as the detection result and reference point cloud data, for example.

(F7) In the above-described first, second, third, and fourth embodiments, the server 300 performs the processing from acquisition of vehicle location information to generation of a running control signal. By contrast, the vehicle 100 may perform at least part of the processing from acquisition of vehicle location information to generation of a running control signal. For example, embodiments (1) to (3) described below are applicable, for example.

(1) The server 300 may acquire vehicle location information, determine a target location to which the vehicle 100 is to move next, and generate a route from a current location of the vehicle 100 indicated by the acquired vehicle location information to the target location. The server 300 may generate a route to the target location between the current location and a destination or generate a route to the destination. The server 300 may transmit the generated route to the vehicle 100. The vehicle 100 may generate a running control signal in such a manner as to cause the vehicle 100 to run along the route received from the server 300 and control an actuator using the generated running control signal.

(2) The server 300 may acquire vehicle location information and transmit the acquired vehicle location information to the vehicle 100. The vehicle 100 may determine a target location to which the vehicle 100 is to move next, generate a route from a current location of the vehicle 100 indicated by the received vehicle location information to the target location, generate a running control signal in such a manner as to cause the vehicle 100 to run along the generated route, and control an actuator using the generated running control signal.

(3) In the foregoing embodiments (1) and (2), an internal sensor may be mounted on the vehicle 100, and detection result output from the internal sensor may be used in at least one of the generation of the route and the generation of the running control signal. The internal sensor is a sensor mounted on the vehicle 100. More specifically, the internal sensor might include a camera, LiDAR, a millimeter wave radar, an ultrasonic wave sensor, a GPS sensor, an acceleration sensor, and a gyroscopic sensor, for example. For example, in the foregoing embodiment (1), the server 300 may acquire detection result from the internal sensor, and in generating the route, may reflect the detection result from the internal sensor in the route. In the foregoing embodiment (1), the vehicle 100 may acquire detection result from the internal sensor, and in generating the running control signal, may reflect the detection result from the internal sensor in the running control signal. In the foregoing embodiment (2), the vehicle 100 may acquire detection result from the internal sensor, and in generating the route, may reflect the detection result from the internal sensor in the route. In the foregoing embodiment (2), the vehicle 100 may acquire detection result from the internal sensor, and in generating the running control signal, may reflect the detection result from the internal sensor in the running control signal.

(F8) In the above-described fifth embodiment, the vehicle 100e may be equipped with an internal sensor, and detection result output from the internal sensor may be used in at least one of generation of a route and generation of a running control signal. For example, the vehicle 100e may acquire detection result from the internal sensor, and in generating the route, may reflect the detection result from the internal sensor in the route. The vehicle 100e may acquire detection result from the internal sensor, and in generating the running control signal, may reflect the detection result from the internal sensor in the running control signal.

(F9) In the above-described fifth embodiment, the vehicle 100e acquires vehicle location information using detection result from the external sensor. By contrast, the vehicle 100e may be equipped with an internal sensor, the vehicle 100e may acquire vehicle location information using detection result from the internal sensor, determine a target location to which the vehicle 100e is to move next, generate a route from a current location of the vehicle 100e indicated by the acquired vehicle location information to the target location, generate a running control signal for running along the generated route, and control an actuator of the vehicle 100e using the generated running control signal. In this case, the vehicle 100e is capable of running without using any detection result from an external sensor. The vehicle 100e may acquire target arrival time or traffic congestion information from outside the vehicle 100e and reflect the target arrival time or traffic congestion information in at least one of the route and the running control signal. The functional configuration of the system 500 may be entirely provided at the vehicle 100. Specifically, the processes realized by the system 500 in the present disclosure may be realized by the vehicle 100 alone.

(F10) In the above-described first, second, third, and fourth embodiments, the server 300 automatically generates a running control signal to be transmitted to the vehicle 100. By contrast, the server 300 may generate a running control signal to be transmitted to the vehicle 100 in response to operation by an external operator existing outside the vehicle 100. For example, the external operator may operate an operating device including a display on which a captured image output from the external sensor is displayed, steering, an accelerator pedal, and a brake pedal for operating the vehicle 100 remotely, and a communication device for making communication with the server 300 through wire communication or wireless communication, for example, and the server 300 may generate a running control signal responsive to the operation on the operating device. In the following, driving of the vehicle 100 by such control will also be called "remote manual driving." In this embodiment, if the process completion detector 214 or the manufacturing information acquisition unit 314 detects completion of a process by at least one step included in a course of manufacture, it is also possible for the control content change unit 216 to change a content in control over the vehicle 100. More specifically, if completion of the process is detected, the control content change unit 216 may change a content in control by the remote manual driving in such a manner as to implement the control using an element added to the vehicle 100 or an element in the vehicle 100 changed as a result of completion of the process, or may stop the remote manual driving and start unmanned driving using the added or changed element, for example. If the completion of the process is detected, the control content change unit 216 may change a content in the control by the remote manual driving in such a manner as to relax the threshold 226 to a value that imposes difficulty in giving preference to driving control using the operation unit 170. If the completion of the process is detected, the control content change instruction unit 316 may instruct the vehicle 100 to make each of the above-described content changes in the control.

(F11) The vehicle 100 may be manufactured by combining a plurality of modules. The module means a unit composed of one or more components grouped according to a configuration or function of the vehicle 100. For example, a platform of the vehicle 100 may be manufactured by combining a front module, a center module and a rear module. The front module constitutes a front part of the platform, the center module constitutes a center part of the platform, and the rear module constitutes a rear part of the platform. The number of the modules constituting the platform is not limited to three but may be equal to or less than two, or equal to or greater than four. In addition to or instead of the platform, any parts of the vehicle 100 different from the platform may be modularized. Various modules may include an arbitrary exterior component such as a bumper or a grill, or an arbitrary interior component such as a seat or a console. Not only the vehicle 100 but also any types of moving object may be manufactured by combining a plurality of modules. Such a module may be manufactured by joining a plurality of components by welding or using a fixture, for example, or may be manufactured by forming at least part of the module integrally as a single component by casting. A process of forming at least part of a module as a single component is also called Giga-casting or Megacasting. Giga-casting can form each part conventionally formed by joining multiple parts in a moving object as a single component. The front module, the center module, or the rear module described above may be manufactured using Giga-casting, for example.

(F12) A configuration for realizing running of a vehicle by unmanned driving is also called a "Remote Control auto Driving system". Conveying a vehicle using Remote Control Auto Driving system is also called "self-running conveyance". Producing the vehicle using self-running conveyance is also called "self-running production". In self-running production, for example, at least part of the conveyance of vehicles is realized by self-running conveyance in a factory where the vehicle is manufactured.

The control and the method thereof described in the present disclosure may be realized by a dedicated computer provided by configuring a processor and a memory programmed in such a manner as to implement one or a plurality of functions embodied by a computer program. Alternatively, the controller and the method thereof described in the present disclosure may be realized by a dedicated computer provided by configuring a processor using one or more dedicated hardware logic circuits. Still alternatively, the controller and the method thereof described in the present disclosure may be realized by one or more dedicated computers configured using a combination of a processor and a memory programmed in such a manner as to implement one or a plurality of functions, and a processor configured using one or more hardware logic circuits. The computer program may be stored as an instruction to be executed by a computer into a computer-readable tangible non-transitory recording medium.

The present disclosure is not limited to the embodiments described above and is able to be realized with various configurations without departing from the spirit thereof. For example, technical features in the embodiments corresponding to the technical features in the aspects described in the section of SUMMARY are able to be replaced with each other or combined together as necessary in order to solve part or the whole of the problems described previously or to achieve part or the whole of the effects described previously. When the technical features are not described as essential features in the present specification, they are able to be deleted as necessary.

What is claimed is:

1. A moving object manufactured in a factory, comprising:
a driving controller that implements driving control over the moving object by unmanned driving during a course of manufacture of the moving object in the factory;
a process completion detector that detects completion of a process by at least one step included in the course of manufacture;
a control content change unit that changes a content in control over the moving object when the completion is detected;
a communication unit for receiving a control command for remote control;
an operation unit for manual driving of the moving object; and
a storage device storing a threshold set in advance using the amount of operation on the operation unit, the threshold being used for judging whether to give preference to driving control using the operation unit over driving control by the remote control when the driving control by the remote control and the driving control using the operation unit are implemented simultaneously, wherein
the driving controller implements driving control over the moving object in response to the received control command during the course of manufacture
the process completion detector detects the completion by a step prior to a predetermined step where a worker possibly touches the operation unit, the prior step being of the at least one step, and
when the completion of the process by the prior step is detected, the control content change unit changes the content in such a manner as to relax the threshold to a value that prevents giving preference to the driving control using the operation unit.

2. The moving object according to claim 1, wherein
the process completion detector detects the completion of a process of adding an element to the moving object or a process of changing an element provided in the moving object performed by the at least one step, and
when the completion is detected, the control content change unit changes the content in such a manner as to implement the control using the element added to the moving object or the element in the moving object changed as a result of the completion.

3. The moving object according to claim 2, wherein
the step includes an object detection device mounting step where a process of adding an object detection device as the element to the moving object is performed, the object detection device including at least one of a radar device and a camera, and being capable of detecting an object around the moving object, and
when the completion of the object detection device mounting step is detected, the control content change unit changes the content in such a manner as to implement collision prevention control using the added object detection device.

4. The moving object according to claim 3, wherein
the control content change unit further changes the content in such a manner as to cause the moving object to run by driving control over the moving object using the collision prevention control instead of driving control by the remote control.

5. The moving object according to claim 2, wherein
the step includes a speed detection device mounting step where a process of adding a speed detection device as the element to the moving object is performed, the speed detection device including at least one of a vehicle speed sensor, a wheel speed sensor, an acceleration sensor, and a yaw rate sensor, the speed detection device being capable of acquiring speed information about a speed of a vehicle as the moving object, and
when the completion of the speed detection device mounting step is detected, the control content change unit changes the content in such a manner as to implement driving control using the speed information detected by the added speed detection device.

6. The moving object according to claim 1, wherein
the driving controller generates a control signal for moving the moving object by the unmanned driving and implements driving control over the moving object in response to the control signal during the course of manufacture.

7. A server comprising:
a remote controller that causes a moving object manufactured in a factory to run by remote control, the moving object comprising a communication unit, and a driving controller, the communication unit being for receiving a control command for the remote control, the driving controller implementing driving control over the moving object in response to the received control command during a course of manufacture in the factory for manufacture of the moving object;
a manufacturing information acquisition unit that acquires manufacturing information including a progress status of a process by at least one step included in the course of manufacture; and a control content change instruction unit that instructs the moving object to change a content in control over the moving object when completion of the process is detected, wherein the manufacturing information acquisition unit acquires the completion of a process by a step prior to a step where a worker will possibly touch an operation unit for manual driving of the moving object, the prior step being of the at least one step, and when the completion of the process by the prior step is acquired, the control content change instruction unit instructs the moving object to change the content in such a manner as to relax a threshold to a value that prevents giving preference to driving control using the operation unit, the threshold being used for judging whether to give preference to driving control using the operation unit over driving control by the remote control when the driving control using the operation unit and the driving control by the remote control are implemented simultaneously.

8. The server according to claim 7, wherein the manufacturing information acquisition unit acquires the completion of a process of adding an element to the moving object or a process of changing an element provided in the moving object performed by the at least one step, and when the completion is acquired, the control content change instruction unit instructs the moving object to change the content in such a manner as to implement the control using the element added to the moving object or the element in the moving object changed as a result of the completion.

9. The server according to claim 7, further comprising:

an abnormality countermeasure unit that takes an abnormality countermeasure including at least one of stop of manufacture of the moving object and notification when the driving control using the operation unit is implemented preferentially after the threshold is relaxed.

10. A method of manufacturing a moving object, comprising:

causing a moving object to run by remote control during a course of manufacture in a factory for manufacture of the moving object;

acquiring manufacturing information including a progress status of a process by at least one step included in the course of manufacture; and instructing the moving object to change a content in control over the moving object when completion of the process is detected, wherein the acquiring comprises acquiring the completion of a process by a step prior to a step where a worker will possibly touch an operation unit for manual driving of the moving object, the prior step being of the at least one step, and the instructing comprises instructing, when the completion of the process by the prior step is acquired, the moving object to change the content in such a manner as to relax a threshold to a value that prevents giving preference to driving control using the operation unit, the threshold being used for judging whether to give preference to driving control using the operation unit over the remote control when the driving control using the operation unit and the remote control are implemented simultaneously.

* * * * *